United States Patent
Larsson

(10) Patent No.: US 9,594,376 B2
(45) Date of Patent: Mar. 14, 2017

(54) METHOD AND SYSTEM FOR DRIVING A MINING AND/OR CONSTRUCTION MACHINE IN A SAFE MANNER WITHOUT THE RISK OF COLLISION

(71) Applicant: Atlas Copco Rock Drills AB, Orebro (SE)

(72) Inventor: Johan Larsson, Orebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 17 days.

(21) Appl. No.: 13/261,855

(22) PCT Filed: Nov. 15, 2012

(86) PCT No.: PCT/SE2012/051261
§ 371 (c)(1),
(2) Date: May 8, 2014

(87) PCT Pub. No.: WO2013/074034
PCT Pub. Date: May 23, 2013

(65) Prior Publication Data
US 2015/0057886 A1    Feb. 26, 2015

(30) Foreign Application Priority Data
Nov. 18, 2011 (SE) .................................. 1151102

(51) Int. Cl.
*G01D 1/02* (2006.01)
*E21F 13/02* (2006.01)
(Continued)

(52) U.S. Cl.
CPC ................ *G05D 1/021* (2013.01); *B60T 7/22* (2013.01); *B60W 30/095* (2013.01);
(Continued)

(58) Field of Classification Search
CPC ....... G01C 21/00; G01C 21/3407; G05D 1/02; G05D 1/16
(Continued)

(56) References Cited

U.S. PATENT DOCUMENTS

| | | |
|---|---|---|
| 4,069,888 A | 1/1978 | Wolters et al. |
| 4,465,155 A | 8/1984 | Collins |

(Continued)

FOREIGN PATENT DOCUMENTS

| | | |
|---|---|---|
| DE | 102010025612 | 3/2011 |
| EP | 1533776 | 5/2005 |

(Continued)

OTHER PUBLICATIONS

Simultaneous path following and obstacle avoidance control of a unicycle-type robot 7(9) 2007 IEEE International Conference on Robotics and Automation (IEEE Cat No. 07CH37636D)—2007—IEEE—Piscataway, NJ, USA, 6 pp.

(Continued)

*Primary Examiner* — Tan Q Nguyen
(74) *Attorney, Agent, or Firm* — Mark P. Stone

(57) ABSTRACT

The present invention relates to a method for driving a mining and/or construction machine, where said machine is arranged to be controlled by an operator by means of maneuvering means, where said operator, when driving said machine, provides steering commands by means of said maneuvering means for maneuvering said machine. The method comprises, when said machine is being driven in an environment having at least a first obstacle—estimating a path that, has been requested by said operator by means of said steering commands,—by means of a control system determining whether said machine when moving according to said requested path will be driven within a first distance from said first obstacle, and—when said machine, when (Continued)

travelling along said path, will be driven within a first distance from said first obstacle, influencing the path of said machine by means of said control system.

34 Claims, 13 Drawing Sheets

(51) Int. Cl.
| | | |
|---|---|---|
| G05D 1/02 | (2006.01) | |
| G08G 1/16 | (2006.01) | |
| B60W 50/14 | (2012.01) | |
| B60T 7/22 | (2006.01) | |
| B62D 15/02 | (2006.01) | |
| B60W 30/095 | (2012.01) | |
| B60W 30/10 | (2006.01) | |
| E21F 13/00 | (2006.01) | |
| B62D 6/00 | (2006.01) | |
| B60W 50/00 | (2006.01) | |
| B60W 10/22 | (2006.01) | |

(52) U.S. Cl.
CPC ............ *B60W 30/10* (2013.01); *B60W 50/14* (2013.01); *B62D 6/00* (2013.01); *B62D 15/0265* (2013.01); *E21F 13/00* (2013.01); *E21F 13/025* (2013.01); *G05D 1/0214* (2013.01); *G08G 1/166* (2013.01); *B60T 2201/022* (2013.01); *B60W 10/22* (2013.01); *B60W 2050/0064* (2013.01); *B60Y 2200/148* (2013.01); *B60Y 2200/415* (2013.01); *B60Y 2200/417* (2013.01); *G05D 2201/021* (2013.01)

(58) Field of Classification Search
USPC .......................... 701/41, 50, 2, 301, 23, 540
See application file for complete search history.

(56) References Cited

U.S. PATENT DOCUMENTS

| | | | |
|---|---|---|---|
| 5,881,832 A | | 3/1999 | Zitz et al. |
| 5,889,476 A | | 3/1999 | Schmitz |
| 5,999,865 A | * | 12/1999 | Bloomquist et al. ........... 701/25 |
| 6,134,502 A | | 10/2000 | Sarangapani |
| 6,484,078 B1 | * | 11/2002 | Kageyama ........... G05D 1/0297 340/989 |
| 6,694,233 B1 | | 2/2004 | Duff et al. |
| 2001/0021888 A1 | * | 9/2001 | Burns .................. G05D 1/0278 701/23 |
| 2002/0143461 A1 | * | 10/2002 | Burns et al. ................... 701/117 |
| 2004/0054434 A1 | | 3/2004 | Sturges et al. |
| 2004/0193351 A1 | | 9/2004 | Takahashi et al. |
| 2004/0193374 A1 | | 9/2004 | Hac et al. |
| 2007/0027612 A1 | | 2/2007 | Barfoot et al. |
| 2012/0035798 A1 | * | 2/2012 | Barfoot et al. .................. 701/25 |
| 2012/0116666 A1 | * | 5/2012 | Makela ......................... 701/400 |
| 2013/0054133 A1 | * | 2/2013 | Lewis et al. ................... 701/423 |

FOREIGN PATENT DOCUMENTS

| | | |
|---|---|---|
| EP | 1609655 | 12/2005 |
| EP | 1742086 | 6/2006 |
| EP | 1912081 | 4/2008 |
| JP | 01282616 | 11/1989 |
| SE | 533009 | 5/2010 |
| WO | WO 9109275 | 6/1991 |
| WO | WO 01/07976 | 2/2001 |
| WO | WO 2004/086161 | 10/2004 |
| WO | WO 2007/012198 | 2/2007 |
| WO | WO 2009/145695 | 12/2009 |
| WO | WO 2010/149853 | 12/2010 |
| WO | WO 2011/092229 | 8/2011 |
| WO | WO 2011/141629 | 11/2011 |

OTHER PUBLICATIONS

An Evaluation of Local Autonomy Applied to Teleoperated Vehicles in Underground Mines Johan Larsson, Mathias Broxwall, Alessandro Safflotti.

E. S. Duff, J. M. Roberts, and,P. I. Corke. Automation of an underground mining vehicle using reactive navigation and opportunistic localization. In Australasian Conference on Robotics and Automation, Auckland, pp. 151-156.

Automation of an underground mining vehicle using reactive navigation and opportunistic localization Proceedings of the 2003 IEEE/RSJ International Conference on Intelligent Robots and Systems. (IROS 2003). Las Vegas, NV, Oct. 27-31, 2003; [IEEE/RSJ International Conference on Intelligent Robots and Systems],—Oct. 27, 2003; Oct. 27, 2003-Oct. 31, 2003—New York, NY : IEEE, US, 4, , 3775-3780.

F. von Hundelshausen, M. Himmelsbach, F. Hecker, A. Mueller, and H.-J. Wuensche. Driving with tentacles: Integral structures for sensing and motion. J. Field Robot.,25(9):640-673, 200.

* cited by examiner

METHOD AND SYSTEM FOR DRIVING A MINING AND/OR CONSTRUCTION MACHINE IN A SAFE MANNER WITHOUT THE RISK OF COLLISION

FIELD OF THE INVENTION

The present invention relates to driving of mining and/or construction machines, and in particular to a method for driving a mining and/or construction machine according to the preamble of claim 1. The invention also relates to a system and a mining and/or construction machine.

BACKGROUND OF THE INVENTION

In mining and tunneling, for example, there is a constant ongoing process of improving efficiency, productivity and safety. Examples of changes/improvements that are carried out to an increasing extent, perhaps in particular in mining, is the automation, fully or partly, of various processes occurring in mining.

It is, for example, often desirable that at least part of the vehicles/machines that are used in mining/tunneling can be driven fully autonomous, i.e. without an operator being required to influence the steering. Autonomous operation, however, is not always suitable or even economically justifiable. This is true in particular in environments that constantly change, for example in certain types of mines where new galleries/drifts frequently arise, and older drifts can be refilled, which normally has an impact on autonomous operation of machines. This is because a setup of a fully autonomous solution normally is relatively time and resource consuming, and a new setup is at least partially required as soon as the environment in which the autonomous machine is driven changes.

In many situations, therefore, such machines are instead being driven by means of remote control, where the machine is driven without a driver, but where, instead, an operator, for example in a control room, controls the machine by means of suitable maneuvering means, such as, for example, control sticks.

One example of vehicles/machines where remote control often is desirable consists of so called LHD (Load-Haul-Dump) machines. The driving of such machines belong to the more dangerous tasks that exists in mines, for example because they are often used to remove and transport broken rock/ore from, for example, a position where blasting has been performed to another position for further processing. The remote control consequently has the advantage that the operator can be removed from the dangerous environment in which the machine works to a considerably safer location such as, for example, a control room.

Remote control can also be used for other kinds of machines, e.g. when drilling by means of drilling rigs and when driving machines, e.g. in the form of mine trucks.

There is an exchange of data between the machine and, e.g., the, usually located on a distance, control room where an operator controls the machine by means of said data exchange during such remote control of machines. These data can, for example, consist of steering commands for maneuvering the vehicle, sensor data from various sensors arranged on the machine and video data (video streams) from one or more video cameras arranged on the machine.

The one (or more) video streams being received from the machine and other data, respectively, can, for example, be presented on a display arranged in the control room, whereby the operator can use the video pictures for orientation in the surroundings of the machine and maneuver the machine in a desired manner. In order to facilitate remote control of the machine, other data can also be used in addition to said video data, such as, for example, a so called "machine view". The machine view depicts the machine and its surroundings, preferably from the above, and facilitates, for example, an estimation of the lateral clearance distance of the machine, while the video facilitates detection of obstacles that are not disclosed by the machine view.

Irrespective of these aids, however, the machine surroundings and actual direction of travel in relation to the surroundings are not perceived as well during remote control as in the case when the operator is actually present in the machine.

In case the remote controlled machine is stationary or substantially stationary, which, for example, often can be considered to be the case with a drilling drill rig that is moved by comparatively small steps at a time, this is a less significant problem, but when remote controlling e.g. loading machines or mine trucks, which can be arranged to be remote controlled for longer distances in, for example, a mine, the reduced perception has as result that the machine oftentimes is being driven with a lower speed when being remote controlled than when the machine is being driven by an operator that is present at the machine.

SUMMARY OF THE INVENTION

It is an object of the present invention to provide a method for driving a mining and/or construction machine. This object is achieved by means of a method according to claim 1.

The present invention relates to a method for driving a mining and/or construction machine, where said machine is arranged to be controlled by an operator by means of maneuvering means, where said operator, when driving said machine, provides steering commands by means of said maneuvering means for maneuvering said machine. The method comprises, when said machine is being driven in an environment having at least a first obstacle:

estimate a path that has been requested by said operator by Means of said steering commands, by means of a control system determining whether said machine when moving according to said requested path will be driven within a first distance from said first obstacle, and when said machine, when travelling along said path, will be driven within a first distance from said first obstacle, influence the path of said machine by means of said control system.

According to the present invention, it is provided a method where it is determined whether a machine during movement will be driven in such a manner that the machine, when travelling along a selected path, i.e. the track along which the machine will move according to current steering commands, will come within a first distance from an obstacle. If this is the case the path of the machine is influenced according to the present invention, e.g. by influencing the application of a steering angle. By means of this a control system that controls the machine, such as, for example, the machine controls system, can influence the maneuvering of the machine such that the machine is being driven in a safe manner without the risk of collision even though the machine is "from a general point of view" is completely operator controlled.

The control signals from the operator go, in the usual case, via the machine control system to actuators such as motor and hydraulic valves for brake and steering. The control system, however, normally does not process the control signals, but the control signals are translated when necessary to a corresponding setting of actuators, valves etc. This is valid, in general, for all kinds of maneuvering, i.e. for example when the operator is located on board the machine as well as in remote control by means of radio control. According to the present invention, on the other hand, the control signals from the operator are evaluated in relation to surrounding obstacles, and are converted, when required, by functions for so called, "local autonomy", so that the operator, when there is a risk that the machine when travelling according to the requested path will be driven within a first distance from said first obstacle, no longer has a direct access to the setting of actuators etc., but the steering signals from the operator are first subjected to a processing by the control system, where the actuator settings as much as possible follow the commands given by the operator but where the signals are filtered by controllers such that the machine automatically steers away from obstacles and/or prevents steering angles that result in the machine being at risk of colliding with obstacles in the path.

For example, the present invention makes it easier for an operator of a machine to drive the machine in a manner that reduces the probability of undesirably hitting walls or other obstacles. The present invention thereby reduces the impact that difficulties with controlling the machine has on the productivity of a remote controlled machine. In general, the productivity of a remote controlled machine is lower than the productivity of a machine where the operator steers the machine when present in the machine. This is partly due to the fact that the remote controlled machine in general is being driven at a lower speed, and partly because maintenance costs of a remote controlled machine usually is higher since a remote controlled machine more often collides with or scrapes against walls than a machine having an operator present onboard. Preventing the operator from controlling the machine in a manner that, for example, would result in collision or running into a ditch according to the present invention can consequently reduce such maintenance costs and wear.

The surroundings in which the machine is travelling can comprise a plurality of obstacles, such as, for example, various rock walls. One and the same tunnel wall can, however, also constitute a large number of obstacles, e.g. when a laser range scanner measures a number of distances in various directions, where each measurement represents an obstacle. Consequently it can be determined whether the machine when moving according to the requested path will be driven within a first distance from at least one of said plurality of obstacles.

Influencing the path of the machine can, for example, be such that driving the machine according to the requested path is prevented, where the requested path can be prevented for example by maneuvering said machine by means of said control system according to another path, being different from the path requested by the operator.

Preferably, however, the machine is driven essentially according to the steering commands that have been given by the operator for as long as the path that has been requested by the operator by means of the maneuvering means results in the machine being driven with a greater distance than said first distance to surrounding obstacles.

When determining whether said machine when moving according to said requested path will be driven within a first distance from an obstacle, a shortest distance to an obstacle along the requested path can be determined, whereby the machine is being driven according to said requested path when the shortest distance to an obstacle along the requested path exceeds said first distance. Said first distance can be a distance to an obstacle in the direction of travel of the machine, but also a distance to a lateral obstacle, i.e. a smallest distance that the machine must keep from, for example, surrounding rock. Hereby the path of the machine can be defined as an area in front of the machine having a width corresponding to the width of the machine with the addition of a first safety distance, where obstacles within said area constitutes obstacles in said path.

A steering angle dependent safety distance is used according to one embodiment, where the steering angle dependent safety distance can be dependent also on the length of the machine in front of the front wheel axle in the direction of travel. This steering angle dependent safety distance can be arranged to only, or at least, be applied on the outer side of the machine when turning, since it is the outer corner of the machine that is most probable to hit an obstacle when there is a large overhang in front of the front axle in the directional travel. The said area can have any suitable length, such as for example the stopping distance that is required to bring the machine to stand still, or the stopping distance with the addition of some suitable further distance.

The safety distance to surrounding lateral obstacles of said machine can, for example, be the same on each side of the center axis of the machine in the longitudinal direction, but the safety distances can also be arranged to be set to different values for each side of the machine, respectively. This difference in safety distance can at least partially be determined by the operator and/or be different for the inside and outside, respectively, of a curved path in dependence of the steering angle of the machine according to the above.

For example, a ditch can run along one side of a tunnel, whereby it is desirable that the machine is being driven closer to the opposite side. If the obstacle that the ditch represents is not detected, which, for example, can be the case when distances to obstacles according to the above are determined by means of, e.g., a horizontal laser measurement, the machine is still at risk of running into the ditch. This can be prevented, e.g., by the operator setting a lateral safety distance to the wall on the side of the ditch that ensures that the machine will not be allowed to run into the ditch.

When influencing said path of the machine, the control system can determine a plurality of possible paths for the machine, whereby a drivability is determined for each of said paths. The control system can select one of said plurality of paths based on the path being requested of the operator, and baser on the drivability of the various paths, where said selected path, for example, as close as possible can correspond to the path requested by the operator, but where the selected path still ensures that the obstacle is avoided.

The invention can also be used to ensure that the machine is being driven with a speed that is suited for the surroundings in which the machine is present. For example, the invention can ensure that the machine is not being driven at too high speeds. For example, the invention can be used to ensure that the machine is not being driven with a higher speed than a speed where collisions with stationary obstacles can be avoided.

The invention, however, can also be used to drive the machine at higher speeds than the machine normally is driven at when being remote controlled. As has been mentioned, it is often difficult for the operator, in particular when remote controlling the machine, to have an exact knowledge of how the machine is related to surrounding obstacles, such as tunnel walls, for which reason the speed of the remote controlled machine many times is lower than when a machine is controlled by an operator onboard the vehicle. The invention can be used to adapt the speed of the machine to a speed that is suitable for the current surroundings, whereby the machine can be driven at higher speed in comparison to when the machine is completely remote controlled by the operator. The invention can thereby be used to drive a machine e.g. in a tunnel in a more efficient manner, and also, for example, to take corners, drive faster or slower when so is indicated by the operator by the steering commands, in a more efficient manner.

Consequently, by means of the present invention, remote Controlled machines can be driven faster by means of the described function than what is possible when the machine is controlled directly by an operator. The invention is further suitable also for manual driving, where the invention, for example, can make it easier for inexperienced, unskilled and careless operators to drive the machine at higher speeds while at the same time wear of the machine is reduced. Furthermore, the difference in the degree of concentration that is required when remote controlling a machine in comparison to when being present in the machine is reduced, where remote control normally requires a higher degree of concentration from the operator.

The alternative paths that are being determined by the control system can, for example, consist of the tracks that the machine would follow when being set to said steering angles. Consequently, a relatively large number of possible paths (steering angles) can be evaluated, whereby a steering angle that is determined to be the most advantageous based on said criteria can be selected and followed. Apart from the steering angle request from the operator these criteria can, for example, comprise distances to surrounding obstacles for the paths, whereby these distances, for example, can be detectable by sensors arranged on the machine and which, for example, measures distances to stationary objects such as, for example, walls, roofs, or movable obstacles such as, for example, other machines.

The steering commands from the operator can be such that a specific command, such as a specific control stick position, corresponds to a desired steering angle, (such as wheel angle or hinge angle at an articulated machine), whereby the path essentially will consist of a circular arc having a radius determined by the steering angle.

The steering command/control stick maneuvering from the operator can also be such that a certain control stick position corresponds to a request for a steering angle alteration, where this steering angle alteration for example can consist of a speed by means of which the control angle is to be changed, i.e. the steering angle is not constant for a constant control stick position with the result that the path can exhibit, for example, a spiral shape instead of a circular arc. A return of a control stick to a "center position" can, for example, be arranged to result in a driving at the current steering angle and thereby not necessarily straight forward.

The path consequently, constitutes, a representation of the track along which the machine will move according to the current steering command. As soon as there is a request for an alteration of the manner in which the direction of movement of the machine is changing, the machine will move along a new path.

The invention also has the advantage that the control system does not require any previous knowledge of the surroundings of the machine. The invention can be used directly in a machine even when positioning the machine at an arbitrary position in an arbitrary environment since distances continuously are determined to surrounding obstacles.

The invention also relates to a system and a mining and/or construction machine.

DETAILED DESCRIPTION OF A PREFERRED EMBODIMENT

According to the above, modern mining/tunneling technology can comprise remote controlled operation of machines, where the machines can be controlled and/or supervised, e.g. from a remote location such as a control room. Such machines, in general, consist of machines for drilling or machines for loading and/or transportation.

Figure 1A:
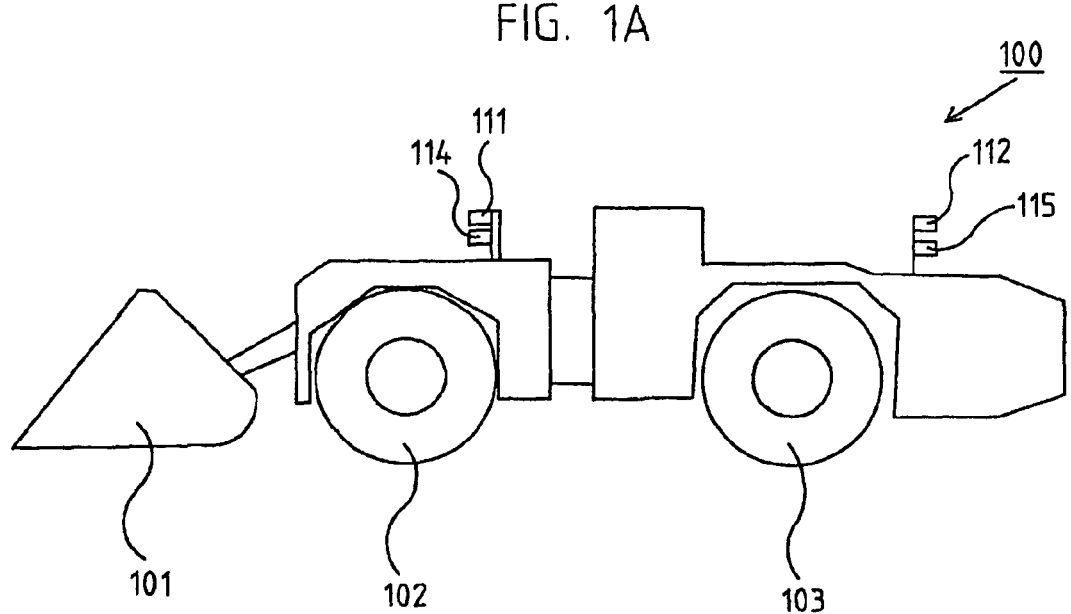
FIG. 1A-B shows a vehicle from the side and from the above, with which the present invention advantageously can be utilized.
Figure 1B:
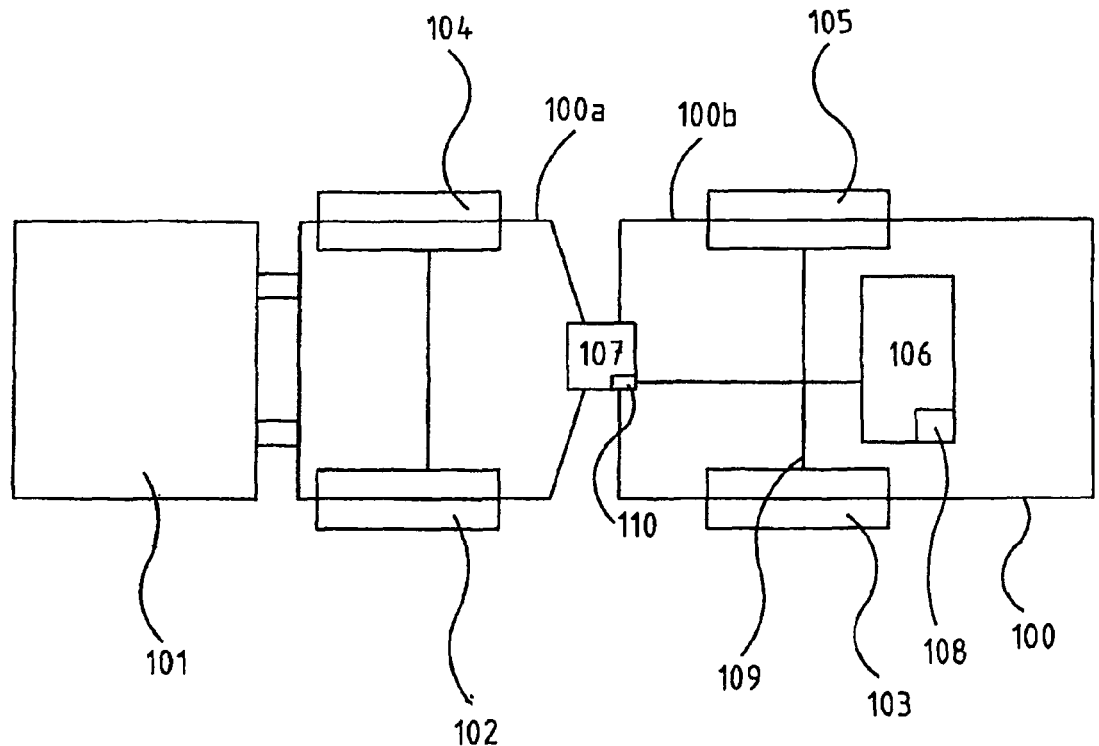

FIG. 1A-B discloses an exemplary machine 100 from the side and from the above and which is suitable for remote controlled operation according to the above, and with which the present invention can be utilized. The machine 100 constitutes a so-called LHD load machine, and is used to load and transport away material such as, for example, blasted rock or masses by means of a bucket 101. Apart from the bucket 101, the machine 100 comprises wheels 102-105 and a control system comprising at least one control unit 106 (FIG. 1B), which controls various of the functions of the machine. Machines of the disclosed kind can comprise more than one control unit, where each control unit, respectively, can be arranged to be responsible for different functions of the machine.

The disclosed machine 100 further constitutes an articulated vehicle, where a front portion 100a is connected to a rear portion 100b by means of a hinge 107, and is consequently steered by means of articulated steering to facilitate maneuvering of the machine. An articulation angle sensor 110 transfers signals regarding current articulation angle to the control unit 106. The hinge 107 is further controlled by means of suitable control member/actuator (not shown). Machines of the disclosed kind are often driven in surroundings where the distance to surrounding rock walls is small which renders maneuvering of a non-articulated machine with conventional front and/or rear wheel steering difficult to perform. The invention, however, is suitable also for machines/vehicles of this kind. The machine 100 further comprises a front 111 and a rear 112 video camera, which are connected to the control unit 106 and which transfers video signals to the control unit for further transmission, e.g. to a remote control operator in a control room. The disclosed machine further comprises laser range scanners 114, 115, the function of which being described below.

Figure 2A:
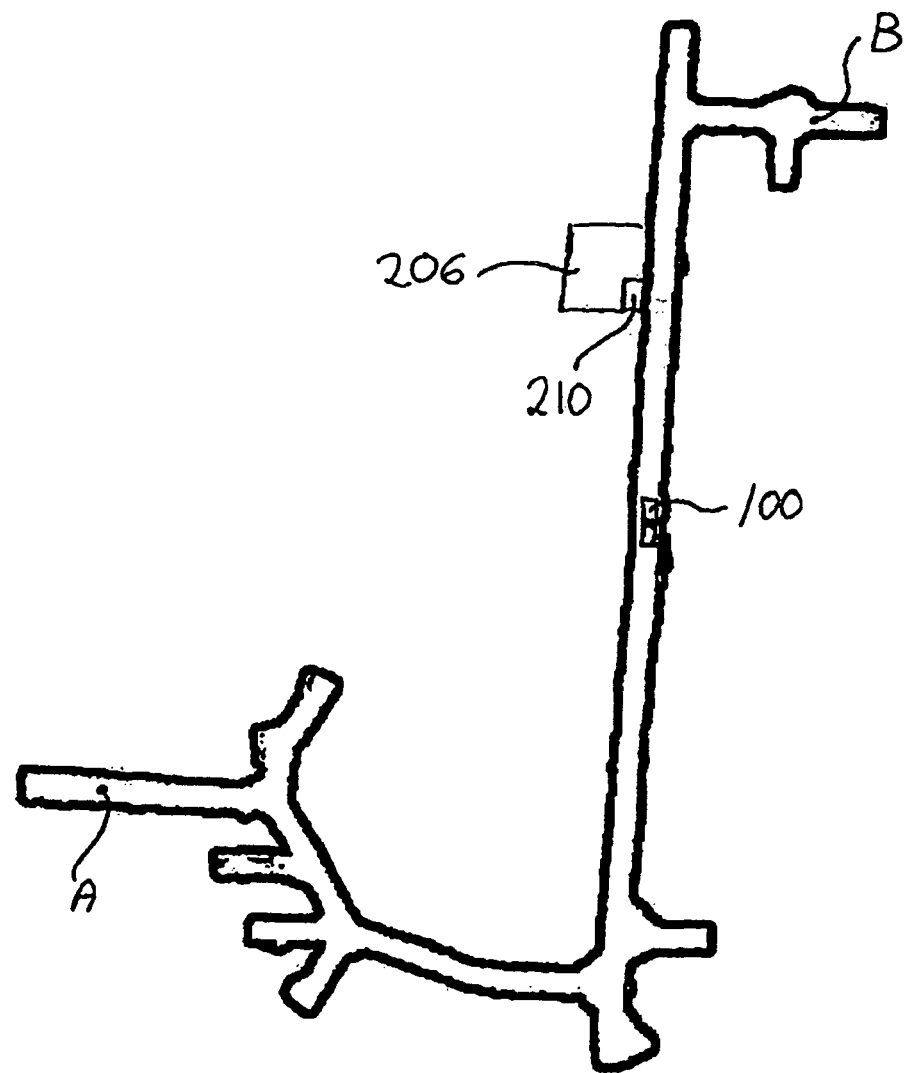
FIG. 2A shows an example of a mine where the present invention advantageously can be utilized.

FIG. 2A discloses an example of a portion of a mine where the present invention advantageously can be utilized, e.g. when operating the machine disclosed in FIG. 1A-B. In FIG. 2A the exemplary machine 100 is disclosed, and which by means of remote control loads masses of rock by means of the bucket 101 at the position A for transportation of the loaded masses to position B for dumping.

The figure only discloses the portion of the mine where the exemplary vehicle 100 is moving, and consequently the mine can comprise a large number of further galleries/drifts. The figure also schematically shows a control room 206, where the operator is located when remote controlling the vehicle 100 by means of a remote control station 210 such as a computer intended for this. The control room 206 can, as in FIG. 2A, be located in the mine, in the vicinity of, or at a greater or smaller distance from the area in which the machine 100 is being driven, alternatively at any suitable location above ground. The machine 100 can communicate with the control room 206, e.g. via a network in the mine, and, e.g., via one or more wireless communication links in a manner known per se. Information is transmitted by means of the wireless connection between the machine 100 and the remote control station 210 in the control room 206.

During remote control, the machine transmits video data, e.g. video streams from one or more of the video cameras 111-112 being present at the machine (the machine can also comprise further video cameras, such as, e.g., one or more video cameras directed in a lateral direction) to the remote control station 210. These one or more video streams are presented to the remote control operator via one or more displays in the control room, whereby the operator remote controls the machine 100 at least partially by means of the video streams. Preferably, other data is also transmitted via the communication link. For example, data regarding current steering angle, speed, bucket angle etc. can be transmitted from the control unit 106 to make it easier for the remote control operator. When remote controlling a load machine/ mine truck, the direction of travel and position in relation to, for example, surrounding rock is, however, as mentioned, not as easily perceived as when actually being present at the machine.

Figure 2B:
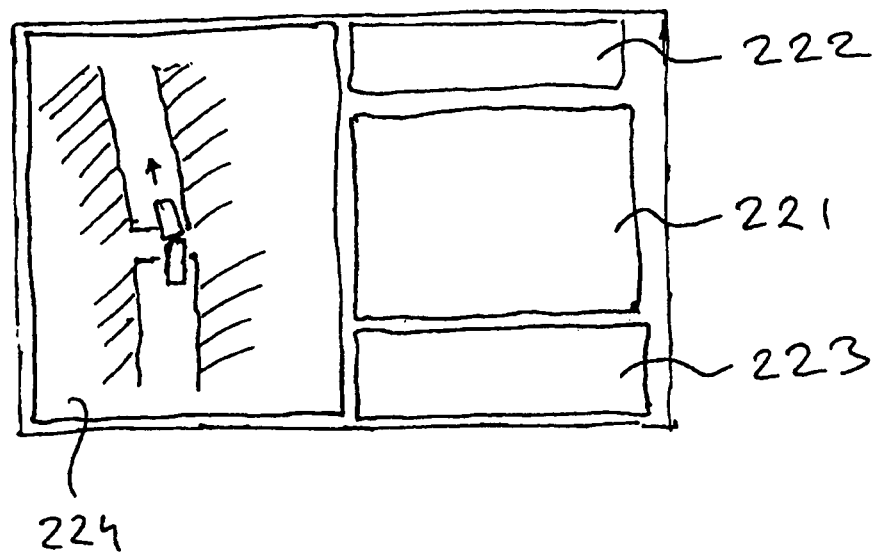
FIG. 2B shows an example of an operator view in the control room shown in FIG. 2A.

For this reason, therefore, apart from the above, further means may also be used to make it easier for the remote control operator. One such means is, in addition to the video streams and possible further data, also to use the current position of the machine in relation to the surroundings, which, according to the above, e.g. can be obtained by means of a so called machine view, where the position of the machine, preferably seen from the above, is reproduced in a representation of the surroundings, whereby the representation of the surroundings can, for example, be displayed on part of a, or a separate, display in the control room. The machine view has, for example, the advantage that it will be easier for the operator to estimate distances to crossings, surrounding obstacles such as rock walls etc. An example of an operator view as shown on, e.g., a display at the remote control station 210 is shown in FIG. 2B. Apart from said video data, which can be displayed in an area 221 of said display, and other, data, such as steering angle, speed, system state, information, warnings and errors etc., which can be displayed in one or more further areas 222, 223 of said display, a machine view 224 is shown. The machine view 224 is preferably arranged such that the current direction of travel of the machine is displayed upwards in the machine representation. The direction of travel is also preferably displayed as being into the video picture 221. That is, in case the machine is reversed, the machine will be reproduced with the rear end directed upwards in the machine representation, while at the same time a video picture from the rear video camera 112 is displayed.

The representation of the surroundings in the machine view 224 can be realized in a plurality of ways. According to the preferred embodiment, this is accomplished by means of a so called laser view, where the machine 100 according to the above comprises a front 114 and rear 115 laser range scanner, which also are connected to the control unit 106 and which deliver sensor signals representing measured distances, i.e. distances to the closest obstacles in the path of the laser beam that stops the laser beam. The laser range scanners 114, 115 can, for example, be arranged to measure the distance in certain directions in an angular range. According to the present example, laser range scanners are used, which measure the distance to the closest object in the longitudinal forward direction of the front portions 100a (and in the longitudinal rearward direction of the rear portion 100b, respectively) and the distance to the closest object (such as rock) for each full degree ±90° from the longitudinal directions A1, A2 (see FIG. 3), respectively. Each laser range scanner, consequently, measures 181 points of measuring, respectively. The distances are measured in one plane (e.g. on the height of the laser at right angles from the vertical line of the machine, alternatively in a horizontal direction from the laser position), the so called laser plane.

As is realized, laser range scanners that measure distances in a considerably larger number of directions can of course be used, i.e. also for fractions of degrees and/or larger angular ranges than the stated ±90°. Conversely, the laser range scanners can be arranged to measure distances in fewer directions, i.e. having a larger distribution between the directions, i.e. sparser than at each degree and/or for a smaller angular range than the stated ±90°. Furthermore, a single omnidirectional laser can be used instead, and/or lasers for measuring in a plurality of planes. Other distance meters being suitable for the purpose can also be used instead of using lasers.

By means of the distances measured by the laser scanners, a representation of the machine surroundings, a so called laser view, can be obtained by marking the area around the machine that according to the laser range scanners is "free", at the same time as everything else is assumed to consist of e.g. surrounding rock or other obstacles.

Figure 3:
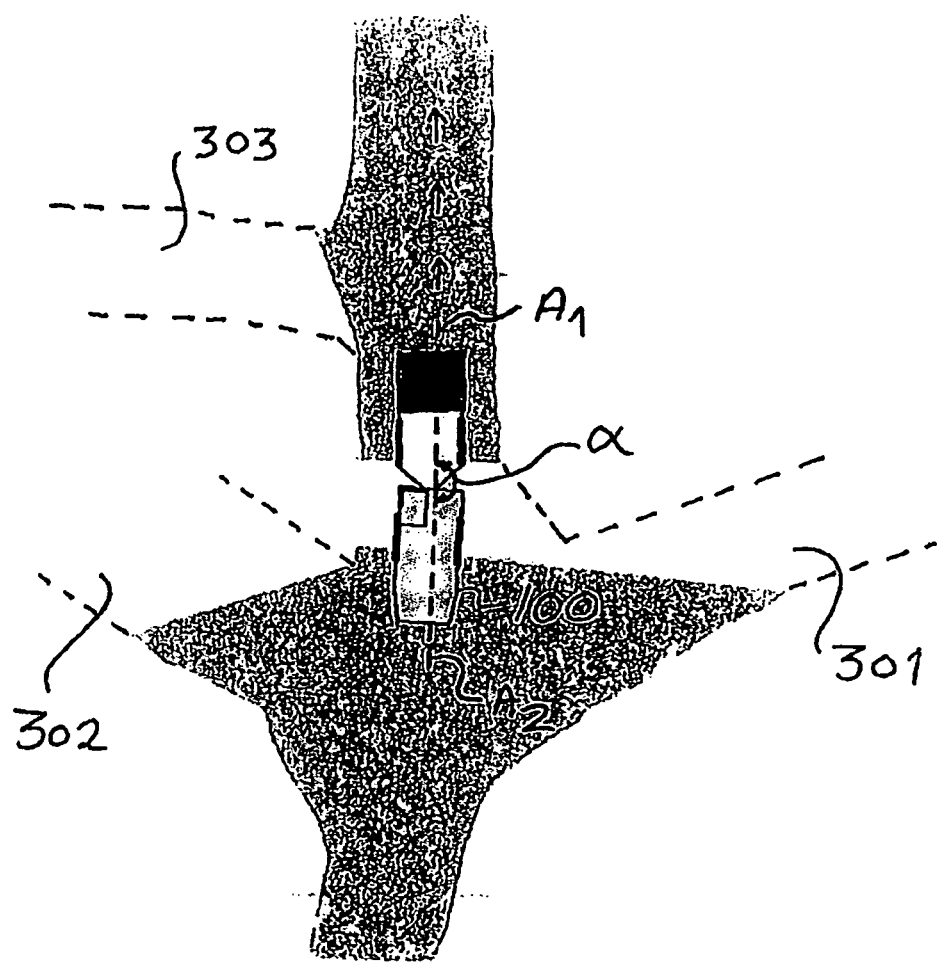
FIG. 3 shows an example of how the machine shown in FIG. 1 can be reproduced in a representation of the surroundings.

An example of a laser view is shown in FIG. 3, where the machine 100 is graphically represented in the representation of the surroundings that has been generated by means of measured distances. Consequently, this embodiment continuously generates, a representation of the surroundings based on laser range data from the current position of the machine. This has the result that the representation can appear somewhat cryptic to an inexperienced viewer. For this reason, the actual appearance of the surroundings, but which at the moment of generation is invisible to the laser, is disclosed in FIG. 3 by dashed lines. As can be seen, the surroundings comprises further "side roads" (drifts) 301-303 that at the present position of the machine 100 are not distinctly detected by the laser range scanners due to stopping rock and/or the limited angular range of the laser. The representation shown in FIG. 3 will, as is realized, continuously change as the machine is being driven, whereby, when travelling in the direction of the "arrows", the drifts 301, 302 will become increasingly "invisible" in the representation of the surroundings, while the drift 303 will be better and better visualized until the machine 100 has passed this drift also.

The representation of the surroundings shown in FIG. 3 can also be used to illustrate further information that has been received from the machine. For example, the steering angle of the vehicle, which for the disclosed machine is the steering angle α between the front and rear machine body, can be graphically, illustrated, for example by drawing axes in the longitudinal direction of the rear and front vehicle body, respectively, where the angle α can be stated with a value.

The view shown in FIG. 3 consequently provides the operator with further information, i.e. when estimating the distance to the next crossing, which can be very useful, e.g. if the machine in FIG. 3 is to turn into the drift 303.

The operator station comprises, apart from said display, a console which, for example, can comprise maneuvering means such as for example control sticks for maneuvering the machine. The operator being present at a distance from the machine can consequently have access to useful means for facilitating remote control. In spite of this it can still be difficult to drive the vehicle in a desired manner.

For example, it can be difficult for the operator to determine the manner in which the machine will respond to a steering command. An operator being present in the machine can use both vision, sense of hearing and a tactile sense to determine the manner in which the machine responds to steering commands. This is more difficult in remote control, where the feedback occurs via video picture from a camera arranged on the machine. Furthermore, it can, for example, be some delay in the steering signals that the operator sends to the machine, for example by use of said one or more control sticks. This has as result that the operator in the remote control often is a little "behind" in the steering which results in larger control stick movements in the control, with a more jerky travel as result. Furthermore, the maneuvering means used by the operator often comprises a so called dead band, i.e. a certain movement of the maneuvering means is possible before the movement is actually detected by the associated control system. It is also, in spite of the assisting aids, still difficult to predict the path of the machine, e.g. with regard to the foremost/far corner of the machine in relation to surrounding obstacles such as rock walls, which has as result that the speed of the machine often must be reduced in order to avoid collisions. This is valid in particular in the taking of corners.

In sum, this means that a machine that is remote controlled usually is being driven at considerably lower average speed than a machine that is driven fully autonomously, or when the operator is present on the machine. According to the present invention, it is provided a control method where manual control of the machine is performed in such a manner that it allows considerably higher machine speeds at the same time as the risk of collision is reduced. This is achieved by comparing the path along which the machine would travel according to a steering angle command that is requested by the operator, and interpreted as a desired steering angle, with a plurality of possible paths, where another path than the path chosen by the operator is chosen when another of said plurality of paths is determined to be more advantageous.

Figure 4:
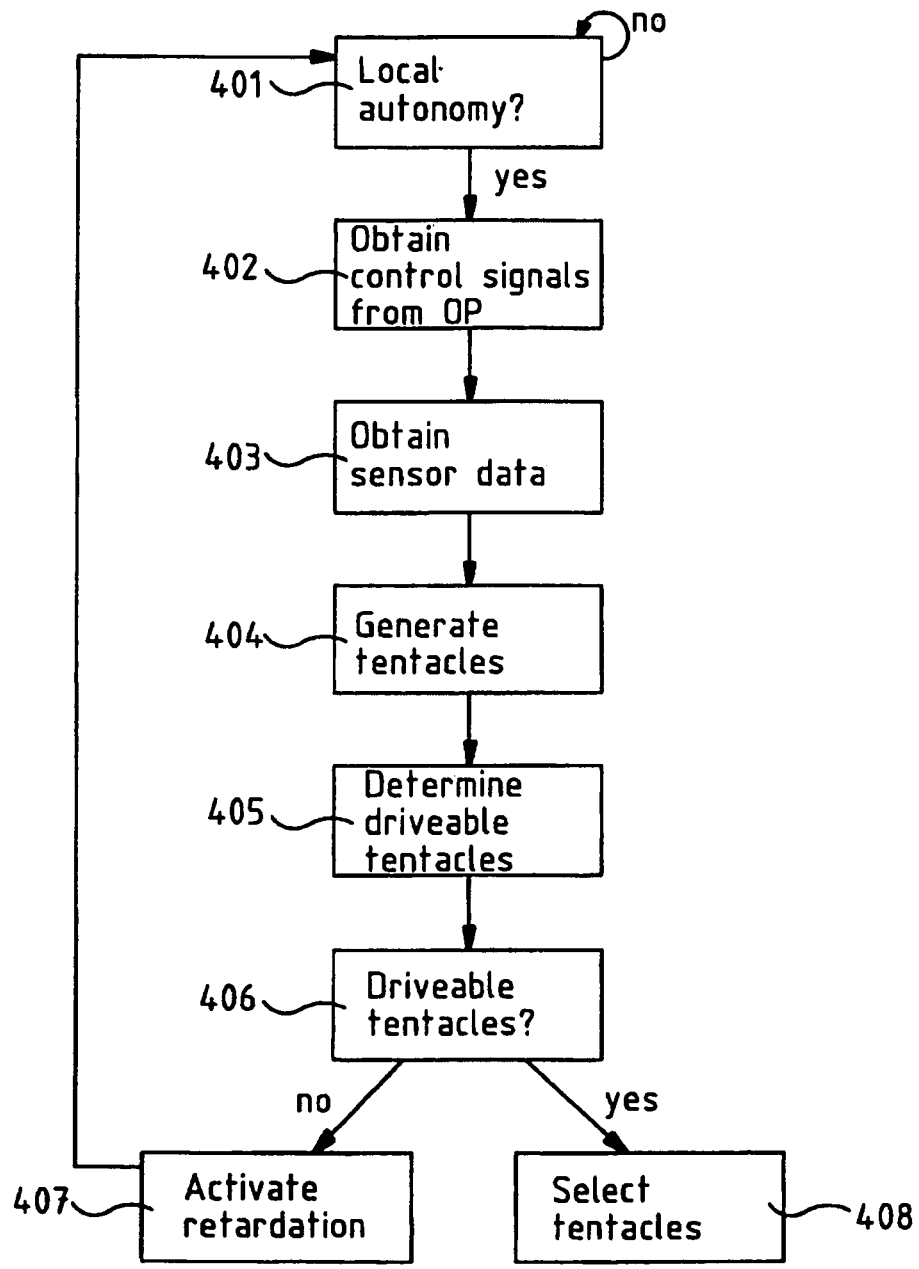
FIG. 4 shows an exemplary method according to the present invention.

An exemplary embodiment 400 according to the present invention for influencing the path of the machine when the path chosen by the operator will result in the machine being driven within a first distance from an obstacle is disclosed in FIG. 4. According to this method, the path is influenced by the desired path being evaluated against alternative paths. The method starts in step 401, where it is determined whether the vehicle is to be driven in a manner in which the control signals of the operator are evaluated in relation to alternative paths based on the surroundings of the machine and being corrected when required such that an optimal path is chosen.

Such a control method consequently means that the machine itself determines the driving of the vehicle to some extent, for which reason this method of driving the vehicle is denoted local autonomy in the below description.

For as long as the machine is not to be driven by local autonomy, i.e. for example to be completely manually controlled or not at all, the method remains in step 401. If, on the other hand, the vehicle is to be driven by means of local autonomy, which, for example, can be stated by the operator by activating this mode by means of a suitable button, handle, lever or the like, such as for example suitable input via a keyboard, the method continues to step 402. In step 402 one or more steering commands are received from the operator, where these steering commands at least comprise a representation of a steering angle command but can, according to the below, also comprise e.g. a desired acceleration action or brake action etc. Instead of these control signals directly influencing control of the one or more actuators on the machine that in turn affects steering angle etc. according to the prior art, the control signals are, instead, transmitted to a path generator. This difference is schematically illustrated in FIG. 5A-B.

Figure 5A:
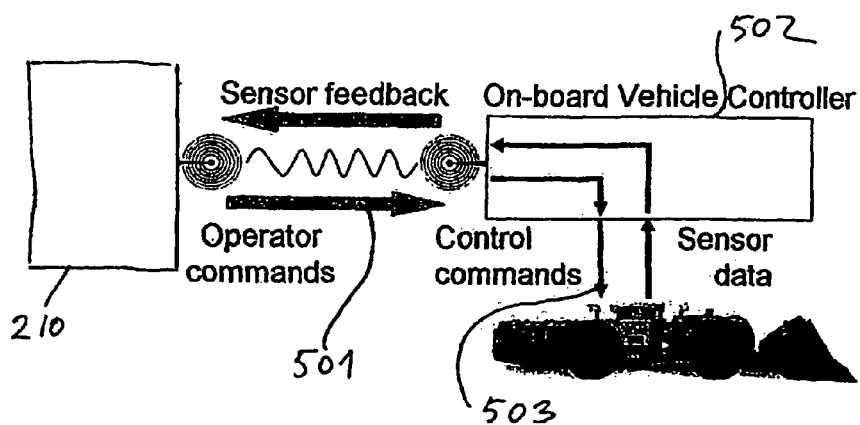
FIG. 5A shows a control principle for remote control according to prior art.

FIG. 5A discloses the function during conventional remote control. The signals 501 that are transmitted from the operator/control room 210 are received by the control system of the machine 100, schematically indicated as 502, and is used to directly control actuators etc. completely according to the requests of the steering signals. Sensor signals from the machine, such as laser data, video signals, are transmitted to the operator/control room to facilitate the continued control for the operator.

Figure 5B:
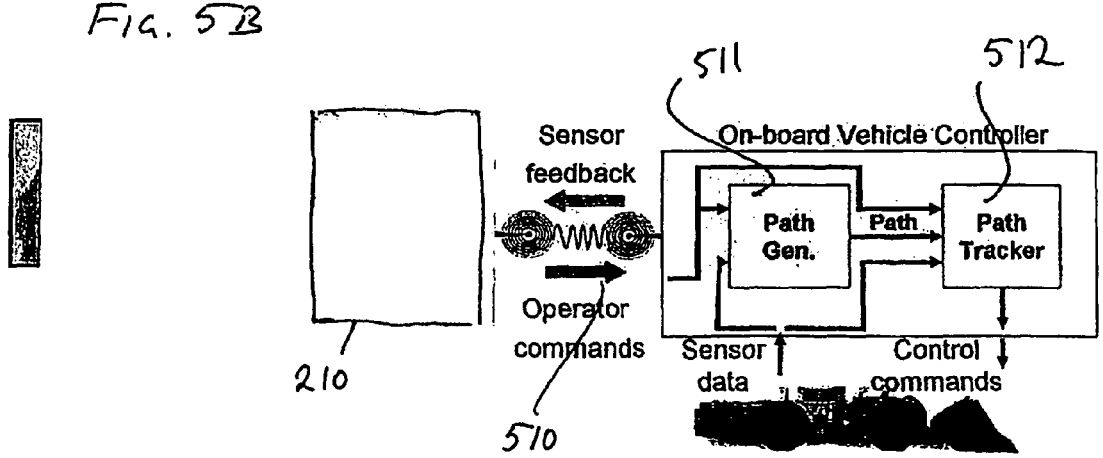
FIG. 5B shows a control principle for remote control according to the present invention.

FIG. 5B discloses the function according to the present invention. Operator commands 510 that are received from the operator at the operator station 210 do not immediately influence the steering of the machine as in the prior art, but are first processed in a path generator 511. Apart from the operator commands also sensor data, e.g. from the laser scanners, are provided to the path generator, step 403 in FIG. 4. A set of possible paths are generated by means of data from the laser scanners, in the following denoted "tentacles", step 404, in order to detect drivable paths by means of the local surroundings of the machine as perceived by the laser scanners. The set of tentacles is generated for some given position, e.g. the front axle of the machine in the direction of travel, or any other suitable position. As will be described below, a position being at a distance from and in front of a suitable reference point at the machine, such as, for example, in front of the center of the front axle of the machine, is used according to the present invention since such a position provides unexpected advantages.

The tentacles consist of possible paths based on various steering angles, and thereby form circular arcs that are determined by any suitable distribution, such as, for example a circular arc for each degree that the steering angle is changed, or, for example, by means of a distribution according to what is exemplified below, whereby circular arcs can be generated for a large number of possible steering angles that the machine can be arranged to follow. If the maximum steering angle of the machine, for example, is 45° in either direction from a straight forward direction, tentacles can, for example, consequently be generated for each degree up to 45° degrees in each direction. Tentacles can naturally be generated with a more dense distribution, i.e. separated by a steering angle difference of a fraction of a degree, or, conversely, be more sparsely distributed with a distribution of more than one degree. Consequently, a number of tentacles are generated in step 403 starting from any suitable point such as, for example, the center of the front axle of the machine or another point in front of this according to the below.

As has been mentioned above, the paths, and consequently the tentacles, can also be of other shapes.

Figure 6:
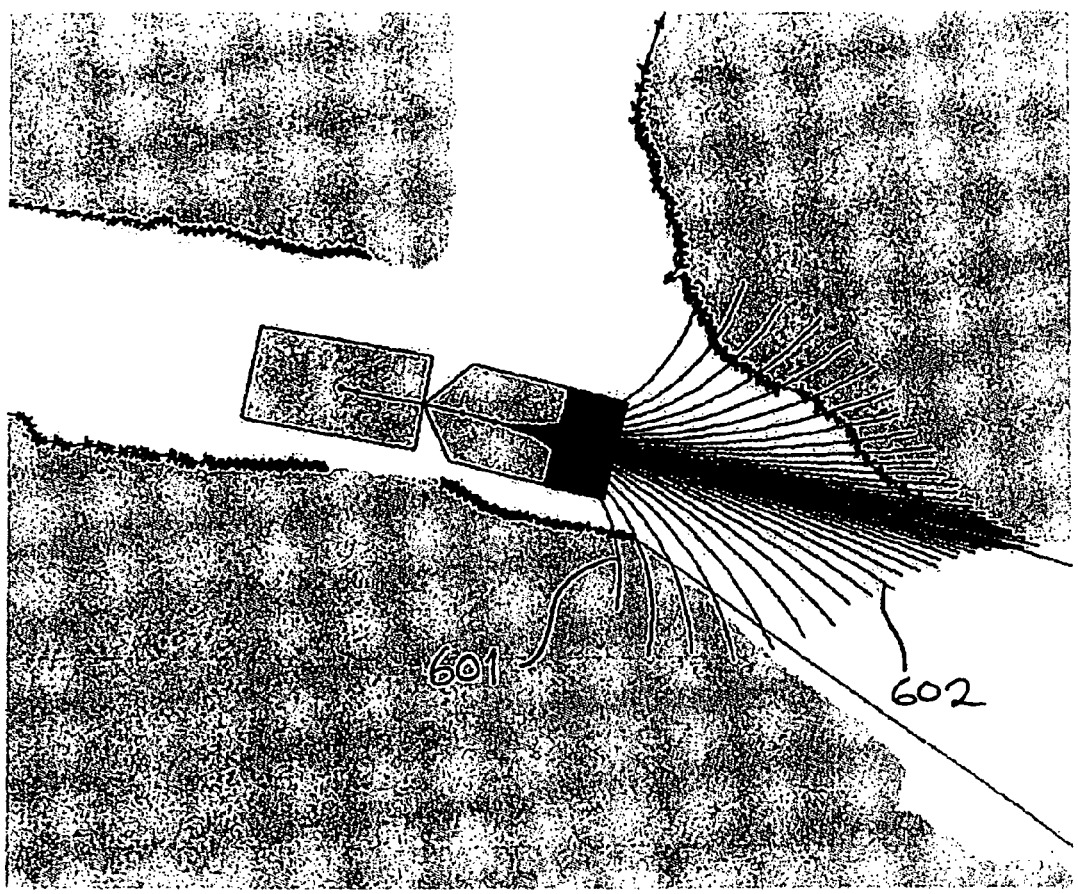
FIG. 6 shows an illustration of possible paths according to one embodiment of the present invention.

An example of a set of tentacles, starting from the front axle of the machine in the direction of travel is illustrated in FIG. 6 where each tentacle consequently represents a theoretically possible path of the vehicle.

The possible paths can be more or less drivable in dependence of the surroundings of the machine. The machine shown in FIG. 6 is in an environment where possible movements to a large extent are limited by rock walls and other obstacles, for which reason practically possible/suitable paths will consist of only a fraction of the possible tentacles. For example travel along the path/tentacle 601 would result in the machine rather immediately running into the rock wall, hence travel along this path is less suitable, while travel along e.g. path 602 can be performed at least along the tentacle length that is illustrated in FIG. 6 (possible constraints of the length of the tentacles are described below). FIG. 6 also shows data from laser scanners 114-115, which data are also provided to the path generator in FIG. 5, and which are indicated as "x" along the rock walls, where each "x" represents a range measurement in one direction from one laser scanner.

In connection to the generation of a set of tentacles it can therefore also be performed an evaluation of the generated tentacles, step 405 below, where tentacles being considered to be non-drivable can be discarded. This determination can be performed in various different ways and one such method is exemplified in FIG. 7A-C. First, however, generation of the tentacles will be described.

Figure 7A:
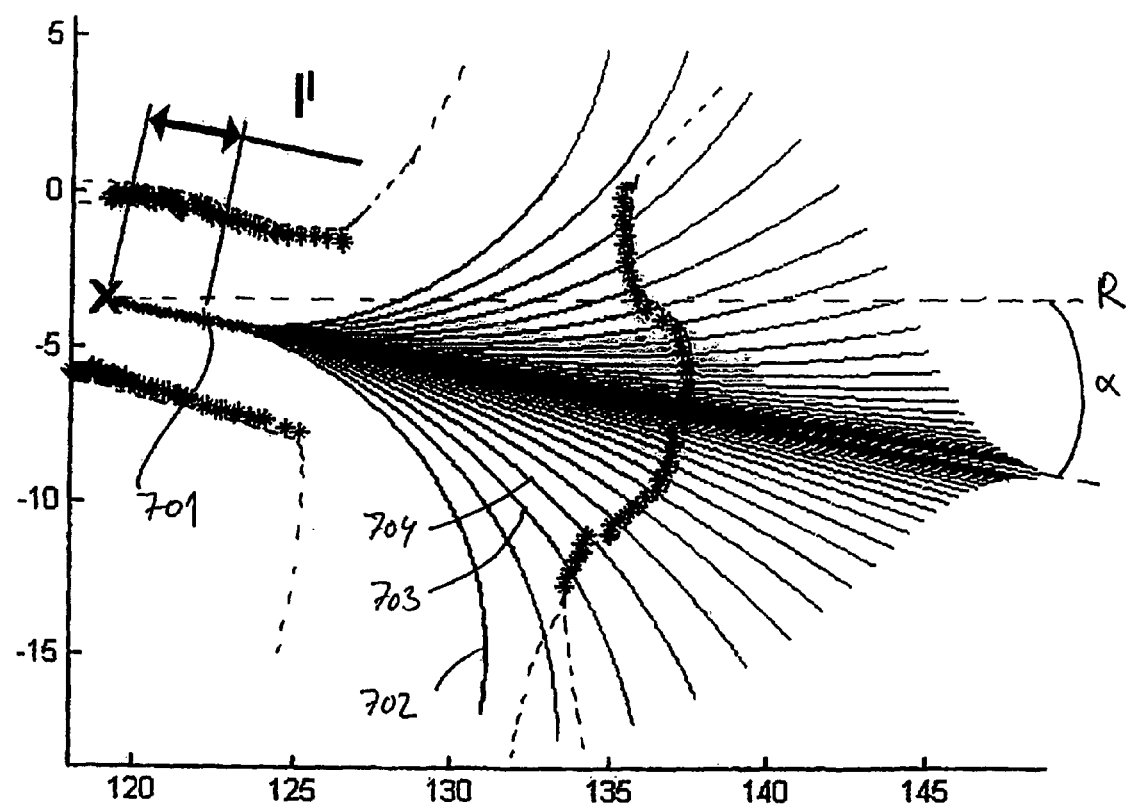
FIG. 7A shows an example of a set of tentacles according to the present invention.

FIG. 7A discloses a set of tentacles for an exemplary situation where the machine is travelling in a certain direction of travel in relation to some suitable reference direction R, and in relation to which changes in direction can be determined, e.g. by means of a gyro. Furthermore, the disclosed machine is at a position where it reaches a T-crossing (in order to facilitate the understanding, the rock walls are indicated by dashed lines), i.e. FIG. 7A represents a different situation than the situation shown in FIG. 6. The generated set of tentacles starts from a point 701, which in this case consists of a point in front of a reference point in form of the center of the front axle of the machine in the direction of travel. Data from the laser scanners, or in this case the front laser scanner in the direction of travel are indicated as stars, "*", in the figure. Each star, consequently, represents a distance measurement in one direction from the laser scanner, and these stars consequently represent distances to the schematically indicated rock walls. As can be seen in FIG. 7A, many of the generated tentacles are drivable only to a certain extent, i.e. to the indicated rock wall. The generated set of tentacles is therefore compared with sensor data from the laser scanner, where each tentacle can be classified as fully drivable, potentially e.g. tentacle 702, which is not disturbed by any obstacle, or partially drivable, such as, for example, tentacles 703, 704, or non-drivable.

A tentacle can, for example, be classified as non-drivable if the possible travel distance along the tentacle is shorter than the distance the machine requires to come to a stop. Alternatively, a tentacle can be classified as non-drivable if the drivable length of the tentacle, for example, is lower than the stopping distance that the machine requires to come to a stop with the addition of some suitable offset. This consequently means that whether a tentacle is determined as drivable or not at least partially will depend on the current speed of the machine, since the faster the machine travels, the longer stopping distance is required and thereby also a longer drivable distance, for each tentacle, respectively.

The set of tentacles that is actually generated can also be dependent on the current speed of the machine. The faster the machine is travelling, the less suitable it is to drive the machine with large steering angles. For this reason, the maximum steering angle for which a tentacle is generated, and thereby the maximally allowable steering angle, can be arranged to be restricted as a function of the speed of the machine, i.e. the faster the machine is travelling, the smaller the maximum steering angle that is applied. The maximum steering angle can, for example, be the maximum steering angle of the vehicle or a large portion thereof for low speeds, while the maximum steering angle at higher speeds e.g. can be restricted to half the maximum steering angle or any other suitable angle. This consequently means that the set of tentacles that is generated will be restricted by the maximum allowable steering angle. Since the machine will then be driven along a track that corresponds to a specific tentacle being chosen from said generated tentacles, it is thereby possible for the operator to request considerably larger control stick movements (greater steering angles) at high speeds than the control system in practice will allow, whereby the requested greater steering angle will not be applied.

Above, the tentacles have been assumed to comprise mutually similar differences in steering angle. According to one embodiment, it can be advantageous to vary the steering angle difference between mutually adjacent tentacles in a non-linear manner. For example, the mutual distribution between tentacles can be arranged such that more tentacles are obtained in a direction, essentially straight forward of the machine, while the tentacles get more and more sparsely distributed the closer to the maximum allowable steering angle at current machine speed that the tentacle is. This is also the case in FIG. 7A, where the tentacles are considerably closer in the current direction of travel of the machine. The number of tentacles that are actually generated can also be arranged to depend e.g. on machine speed.

According to one embodiment the turning radius is defined according to equation 1, where $r_k$ denotes the turning radius of tentacle no. k of a total of n tentacles.

$$r_k = \begin{cases} \rho^k R_j & k = 0, \ldots, (n-3)/2 \\ \infty & (n-1)/2 \\ -\rho^{k-(n+1)/2} R_j & k = (n+1)/2, \ldots, n \end{cases} \quad \text{eq. 1}$$

Tests have disclosed that the number of tentacles n, for example, can be set to 51 and ρ can be set, e.g. to 1.25. The setting of ρ to a value exceeding 1 will result in a tentacle set where the mutual difference between tentacles is smaller in the direction of travel than the mutual difference between tentacles at larger steering angles. The smallest turning radius $R_j$ in eq. 1 can be arranged to be dependent on the speed, and j can consequently represent a set of tentacles for a certain speed j. Consequently sets of tentacles can be generated for a suitable number of different speeds, e.g. with some suitable mutual difference in speed, such as, for example, a suitable difference in speed in the interval 0.01 m/s-0.5 m/s. Alternatively, the set of tentacles, can, for example, be generated for the current speed of the machine.

The smallest turning radius $R_j$ that is used for a set of tentacles for a specific speed j can be determined in any suitable way and, for example, be dependent on various measures of the machine. Equation 2 exemplifies a non-limiting method for determining the turning radius, at $R_j$:

$$R_j = \frac{l^R + l^F \cos(\gamma_j)}{\sin(\gamma_j)}, \quad \text{eq. 2}$$

where $l^F$ and $l^R$ constitutes the distances from the machine hinge to the front and rear axle, respectively, while $\gamma_j$ constitutes the maximum turning angle that is used for the speed set j. As is realized, a different suitable method for determining $R_j$ is used, e.g., for wheel axle steered machines.

As is realized, this only constitutes an example, and $R_j$ can also be determined in any arbitrary suitable way, but consequently preferably being dependent on the current vehicle speed in some manner. The tentacles can further be arranged to be limited in length independent from the restriction that is imposed by laser measurements according to the above. This is schematically illustrated in FIG. 7a, and according to one exemplary embodiment the length of each tentacle, respectively, in a set of tentacles is determined according to equation 3:

$$l_k = \begin{cases} l_j + 10m\sqrt{\dfrac{k}{(n-3)/2}} & k = 0, \ldots, (n-3/2) \\ l_j + 10m\sqrt{\dfrac{n-k}{(n-3)/2}} & k = (n+1)/2, \ldots, n \end{cases}, \quad \text{eq. 3}$$

where $l_j$, for example, can be set according to $l_j$=min(20m, $R_j \cdot \pi/2$). According to eq. 3, each tentacle consequently obtains different lengths, and from the dependence of the smallest turning radius $R_j$, which in turn is dependent on the speed (maximum steering angle) according to eq. 2, the tentacles, consequently, can be arranged to be dependent on speed. According to another embodiment, however, all tentacles can have the same length, where this length can be set to some suitable length, such as, for example, the distance that the vehicle travels during a certain period of time at current speed, alternatively the full range or suitable fraction of the range of the laser.

Figure 8A:
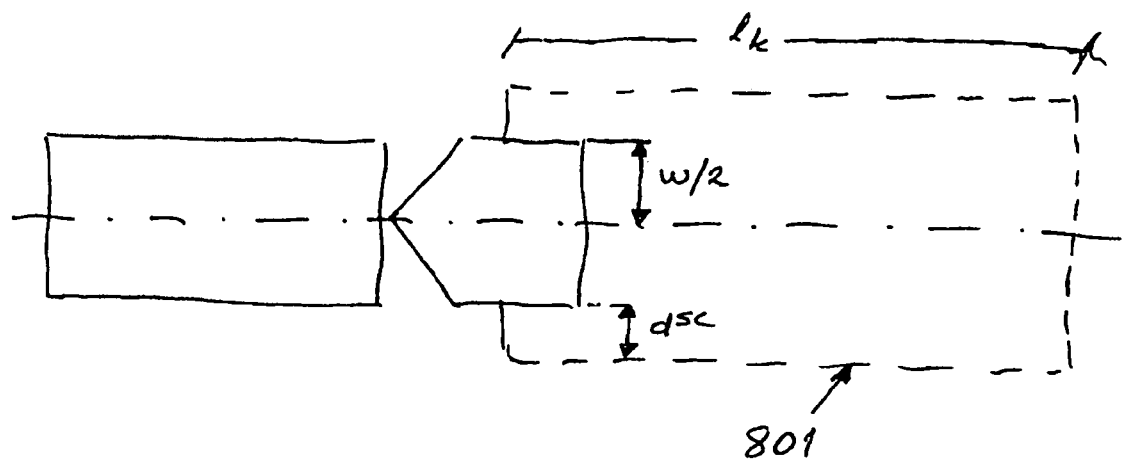
FIG. 8A shows an example of a lateral safety distance.

When evaluating whether a tentacle is drivable or not it is, however, not sufficient to determine only whether the length of tentacle fulfils any length criteria according to the above. This is because the machine by definition has a certain width and all parts of the machine must clear the determined length and not only the line being represented by the tentacle. According to the present invention, therefore each tentacle line is expanded laterally to an area that defines the area that must be free from obstacles in order for the machine to be able to travel according to the tentacle without collision. A fundamental rule when forming this area is that the tentacle is expanded by half the width of the machine in each direction from the tentacle line. In addition, a lateral clearance distance is preferably added, which, for example, can be speed dependent on speed. This is illustrated in FIG. 8A, where the machine is shown having the width w and lateral clearance distance denoted as $d^{sc}$. The marked area 801 represents an expanded tentacle k having the length $l^k$. This offset $d^{sc}$ ensures that the vehicle can navigate along the path that is defined by the tentacle, even with some deviation, without this resulting in a risk of collision.

The lateral clearance distance $d^{sc}$ can consequently be speed dependent and, for example, be in the order of 0.1-0.3 meters at low speeds, and 0.4-1 meter or more at higher speeds. The requirement of clearance distance is, however, different in dependence of the turning angle.

Figure 8B:
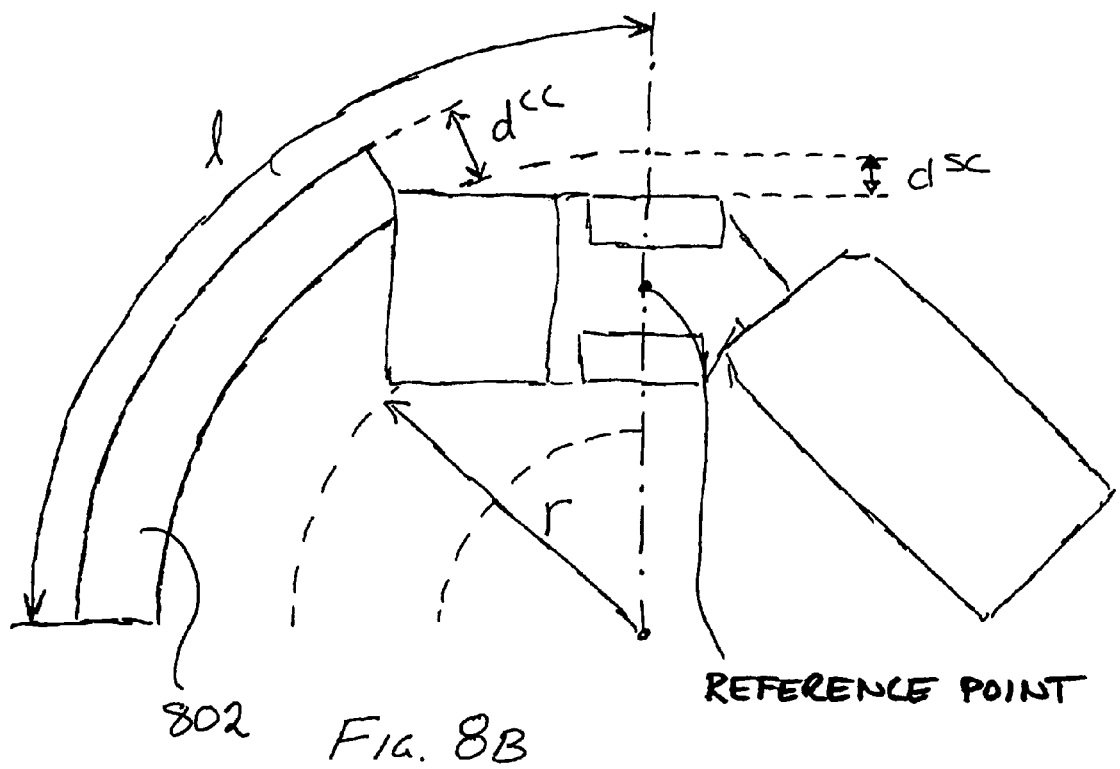
FIG. 8B shows an example of a lateral safety distance when taking turns.
Figure 8C:
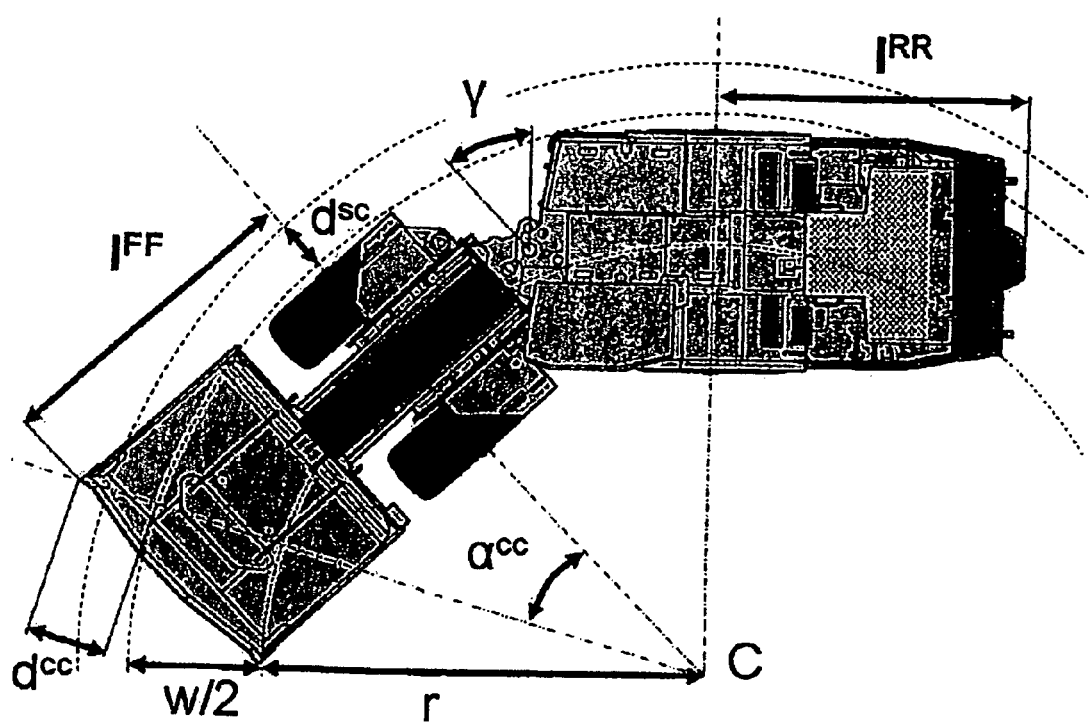
FIG. 8C shows an example of a steering angle dependent lateral safety distance when taking turns.

When the machine turns, it must also be ensured that the machine does not hit the outer wall. Due to the overhang in front of the front wheel axle in the direction of travel, the outer corner of the machine can reach outwards past the lateral clearance distance $d^{sc}$. Therefore, either the lateral clearance distance $d^{sc}$ must take this into account or, alternatively, a further margin that depend on the turning radius of the tentacle is required. This is illustrated in FIG. 8B with turning margin $d^{cc}$, 802. This additional turning margin $d^{cc}$ that is required on the outer side of the machine can be calculated using the turning radius r, the distance from each axle, respectively, to the corners $l^{FF}$ and $l^{RR}$, respectively, and the machine width w and the Pythagorean theorem as $$d^{cc} = \sqrt{(r+w/2)^2 + (l^{xx})^2}$$

where $l^{xx}$ corresponds to $l^{FF}$ if the machine is driven in a forward direction, and $l^{RR}$ if the machine is reversed. The turning radius r, the distance from each axle to corresponding corner $l^{FF}$ and $l^{RR}$, and the machine width is defined in FIG. 8C. The area where the additional turning margin $d^{cc}$ is utilized is further restricted to only be valid in the area in front of the machine as is disclosed in FIG. 8B. This limitation of the area where the extra turning margin $d^{cc}$ is applied is of great importance for the applicability of the method in narrow tunnels in mines. Calculation of the angle $\alpha^{cc}$, which is shown in FIG. 8C, and which defines in front of which angle the turning margin $d^{cc}$ is to be used is trivial and can for example be carried out according to:

$$\tan(\alpha^{cc}) = l^{xx}/(r+w/2),$$

where $l^{xx}$, r and w are defined according to the above.

Consequently, when determining the path of the vehicle, steering signals from the operator and a set of tentacles that preferably is adapted to the current vehicle speed are used, where the set of tentacles can be determined according to the above. Furthermore, the position for which the tentacles are to be determined, is determined. If the vehicle is standing still this is preferably performed for the center of the front most vehicle axle in the direction of travel, since the vehicle will start moving from this position. The path of the vehicle can, however, also be arranged to be calculated with some planning in advance, where the path for the following distance/time, such as, for example, the next 0.1-5 seconds, can be calculated already, where calculations are performed for the position at which the reference point of the machine, such as the center of the front axle in the direction of travel, will be when this time has elapsed. This is schematically shown in FIG. 7A, where the starting point of the tentacles is marked as position 701, but where the center of the front axle of the machine in the direction of travel is marked with an "X".

An advantage in carrying out the calculations for a position in front of the reference point (e.g. the center of the front axle) of the machine is that the movement pattern of the machine can be adapted to the prevailing surroundings to a considerably greater extent. This since the calculated path to said point of determination can comprise both very small and alternating changes in direction, so that a path can be obtained which is not possible to obtain if the circular arcs continuously start from the front wheel axle of the machine.

This point in front of the reference point, however, still consists of a point on a previously determined track, i.e. a point that the reference point is certain to pass.

Referring again to FIG. 4 the tentacles generated in step 405 are consequently classified, so that a set of drivable tentacles is obtained. The classification is performed based on laser data from the laser scanner that measure distances in the direction of travel, and whether a tentacle is drivable or not is mainly determined by the distance from the machine to the closest obstacle in the expanded tentacle. The tentacles where no obstacle is present within the maximum range of the laser measurement, which, for example, can be in the order of 20-30 meters, or the defined length of the tentacles according to the above, and the widening of the tentacles according to the above taken into consideration, are classified as fully drivable.

With regard to the tentacles where obstacles are present within the maximum range of the laser, the tentacle is classified in dependence of the distance to the obstacle, still with widening of the tentacle taken into consideration according to the above. The tentacle can be considered as drivable for as long as the vehicle can be retarded to a full stop before the obstacle is reached. Alternatively, a stopping distance with the addition of some suitable offset can be applied. This smallest distance can consequently be speed dependent.

When this evaluation then has then been performed for each of the tentacles in step 405 a tentacle selection is carried out, where the intention is to find the tentacle of the set of drivable tentacles that fulfills some given set of criteria to a most extent based at least on the steering commands of the operator and preferably also criteria such as drivable length and lateral clearance to obstacles. It is, however, a prerequisite that a tentacle at least has been determined as drivable in order for the tentacle to be possible to select. Therefore, it is determined in step 406 whether one or more drivable tentacles exist.

If there are no drivable tentacles, the method continues to step 407, where a retardation of the machine is activated. The control system can, for example, apply a constant retardation or any other suitable retardation that, preferably with certainty, will be able to brake the vehicle to a stop before an obstacle is encountered, e.g. in the current direction of travel. The method then returns to step 401 for a new determination of tentacles. The retardation means that during the next update of the path/tentacle determination, or after a plurality of updates with continued retardation, the speed of the machine can have been reduced to such extent that previously discarded paths will become drivable, e.g. because the required free tentacle length to obstacles can be arranged to be reduced with reduced speed according to the above, or because the reduced speed has reduced the requirement for lateral clearance and the vehicle thereby can pass e.g. a narrowing that is not allowed to be passed at the higher speed. The retardation also has the result that larger steering angles are allowed in the set of tentacles, which results in greater maneuvering possibilities, and thereby a higher probability to be able to pass obstacles. Consequently, it is not required that the retardation with certainty must retard the vehicle to a complete stop.

Carrying out the measurement for a point in front of the reference point of the vehicle according to the above increases the probability to be able to pass, for example, a narrower passage further. If the determination is carried out for the reference point of the machine, it is possible that the machine, when the retardation is ongoing, will follow a tentacle that results in the machine, once the speed has been reduced to a level where passage is allowed, has reached a position, for example in relation to a rock wall, where continued travel through the narrower portion is not possible due to the current position of the machine, e.g. because the vehicle has ended up too close a rock wall and with an erroneous direction and thereby is not capable to turn in a desired manner without the risk of collision. The chances for the occurrence of this is considerably reduced when the determination is carried out for a position in front of the reference point of the machine, so that suitable measures can be taken at an earlier stage, such that the machine thereby can be steered in a desired direction of travel before it is too late.

The update of the path/the determination of tentacle can be carried out with any suitable update frequency, such as e.g. a suitable time in the interval 0.1-1000 ms or any other suitable shorter or longer interval, perhaps preferably in the interval 0.1-200 ms to ensure that the machine will not move too far between updates of the path.

If it is determined in step 406 that one or more tentacles are drivable the method continues to step 408 for determination of the tentacle that best fulfils set criteria. For example, parameter values representing conformance with the input of the operator, $v^{op}$, the drivable length of the tentacle, $v^c$, and lateral clearance to obstacles, $v^f$ be used. These are discussed one by one below with calculation examples.

Regarding the drivable length $l^0$ of the tentacle, this length is the distance to the first obstacle (i.e. laser measurement) that occurs in the area of the expanded tentacle. For as long as length $l^0$ exceeds a collision distance according to the above, the tentacle is considered drivable.

The drivable length of a certain tentacle can be calculated in a straightforward manner according to the following, where the example starts from the set of tentacles shown in FIG. 7A. All obstacles, i.e. laser measurements, are first transformed to a system of coordinates having origo in the start point of the tentacles (701 in FIG. 7A) and an x-axis parallel to the start direction of the tentacles, i.e. the x-axis is parallel to a tentacle having infinite curve radius, see FIG. 7B. The distance $d_{k,i}$, such as, for example $d_{50,14}$, (see FIG. 7B) is the distance from the center of the circular arc of tentacle k to obstacle (laser measurement) $o_i$, and can be calculated as $$d_{k,i}=\sqrt{x_i^2+(y_i-r_k)^2}.$$

Note that the radius of tentacles that turn to the right (in this example), are defined as negative numbers. $\alpha_{k,i}$=arcsin ($x_i/d_{k,i}$) is the corresponding angle along the circular periphery of tentacle k, and can together with the radius of the tentacle be used to calculate the distance to obstacles, and thereby the length of the tentacle that is free from obstacles. The distance to a lateral obstacle (such as laser measurement $o_{14}$) along tentacle 50, $\Delta_{50,14}$, can consequently generally be calculated as $$\Delta_{k,i} = d_{k,i} - |r_k|.$$

For as long as $\Delta_{k,i}$ exceeds the desired distance $d_{k,i}^C$ (i.e. half the machine width w/2 with the addition of the lateral safety distance $d^{sc}$ and possible additional turning margin $d^{cc}$ according to FIG. 8B) for each obstacle i, where $d_{k,i}^C$ is calculated as:

$$d_{k,i}^C = \begin{cases} 0 & \alpha_{k,i} < 0 \\ w/2 + d^{SC} + d^{CC} & \Delta_{k,i} > 0 \wedge \alpha_{k,i} > \alpha_k^{CC} \\ w/2 + d^{SC} & \text{otherwise} \end{cases}$$

the obstacle i in relation to tentacle k is outside the expanded tentacle.

The shortest distance to an obstacle within the expanded area of a tentacle, i.e. within the radius of the tentacle with the addition and subtraction of the lateral safety distance, can be determined for each tentacle by comparing the distances to the various laser measurements for each tentacle.

Figure 7B:
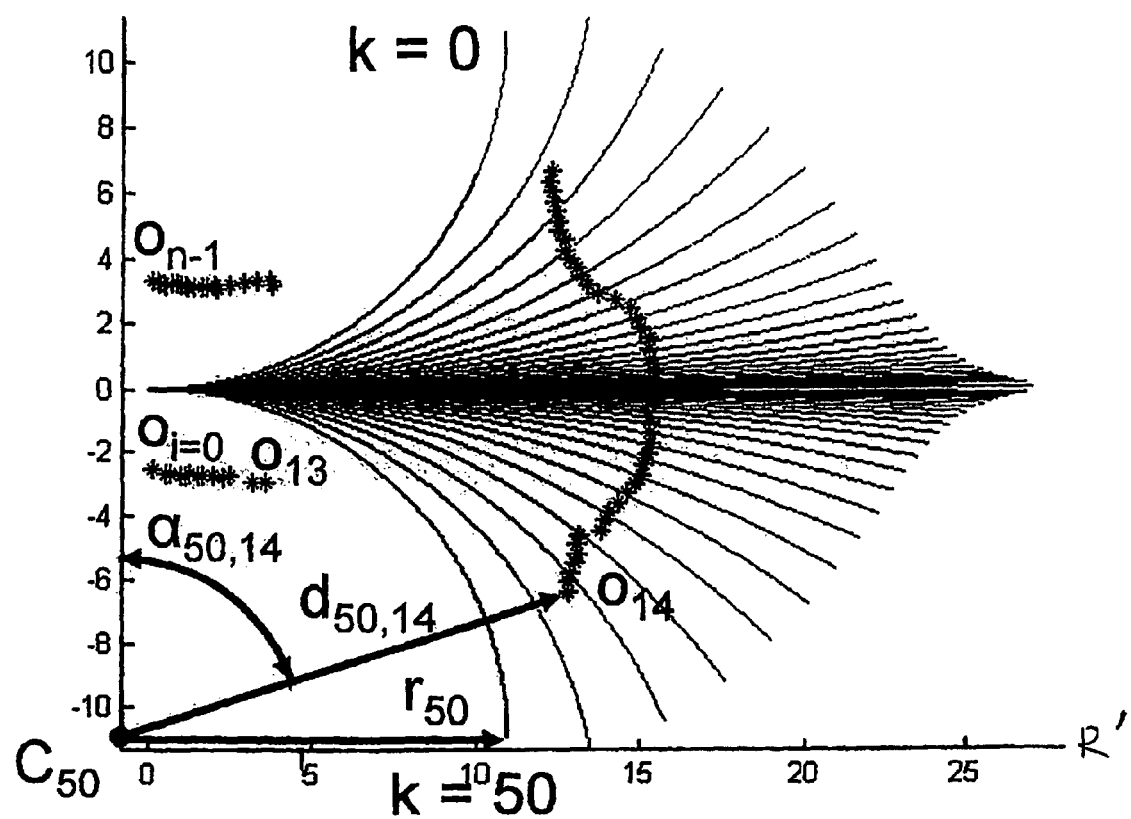
FIG. 7B shows the set of tentacles shown in FIG. 7A in a system of coordinates where the origin coincides with the starting point of the tentacles, and the x-axis is parallel to a straight tentacle, i.e. a tentacle having infinite curve radius.

If there are further obstacles within the area of the expanded tentacle, the drivable length $l^0$ of the tentacle can be determined as:

$$l_k^0 = r_k \alpha_{k,i_{min}},$$

i.e. the radius of the tentacle multiplied with the angle to the closest obstacle (expressed in radians), which can be determined by using a representation according to FIG. 7B.

For as long as the distance $l^0$ of a tentacle exceeds a collision distance, which is the smallest distance that is required to be able to stop the machine, possibly with the addition of an offset, the tentacle is drivable and thereby part of a set of drivable tentacles.

If there are no obstacles within the expanded area of a tentacle, the distance to the first obstacle is the tentacle length.

A set of drivable tentacles is consequently obtained by performing the above determination for all tentacles. As has been mentioned above, a parameter $v^c$ representing the drivability of the tentacle, where $v^c$ can depend on the drivable length $l^0$ of the tentacle, is used when evaluating/selecting a tentacle.

$v^c$ can, for example, be determined according to the following:

$$v^c(l_k^0) = \begin{cases} 0 & l_k^0 \geq l_k \\ 2 - \dfrac{2}{1 + e^{c^c \cdot l_k^0}} & l_k^0 < l_k \end{cases}$$

Where $l^0$ is the distance to the closest obstacle in the expanded tentacle according to the above. By varying the factor $c^c$, the obtained value of the criteria can be varied and thereby weighted. For example, by setting $c^c$ to 0.11 a value of 0.5 is obtained at a free distance of 10 m.

Consequently, according to the equation, a long distance that is free from obstacles results in a low value of $v^c$. As will be explained below, a tentacle having a smallest total value will be determined as a preferred tentacle, and hence a low value of $v^c$ (a long, free tentacle length) is to prefer.

Concerning the parameter value regarding lateral clearance to obstacles, $v^f$, this parameter value can be used to use drivable space in a manner such that tentacles having a greater distance to lateral obstacles are favored in comparison to tentacles having a shorter lateral distance to obstacles. Since a number of obstacles (laser measurements) can surround a certain tentacle, the parameter value $v^f$ can be arranged to depend on all obstacles (at least obstacles within a certain distance). The contribution $s_i(d)$ from a specific obstacle can, for example, be determined according to the following:

$$s_i(d) = \begin{cases} 0 & |\Delta_{k,i}| > (|d_{k,i}^C| + 1.0) \\ s^{max} \dfrac{\Delta_{k,i} - d_{k,i}^C}{\sigma} & |\Delta_{k,i}| > |d_{k,i}^C| \\ s^{max} & |\Delta_{k,i}| \leq |d_{k,i}^C| \end{cases}$$

where the parameters are set to some suitable value, and where experimental tests have disclosed that the following parameters can be used as guidance: $\kappa=1$, $\sigma=0.16$ and $s^{max}=10$.

The parameter $v_k^f$ for each tentacle, respectively, can then be calculated as the sum of the contributions from the various obstacles, and wherein all $v_k^f$ then can be normalized in relation to each other such that $$0 \leq v_k^f \leq 1.$$

$v^f$ can also be determined in any other suitable way. According to one embodiment, the parameter is not used at all, but only the drivable distance according to the above and the operator input according to the below. According to another embodiment, a parameter $v^f$ is used together with the operator input according to the below. According to a further embodiment also historical control data, such as, for example, operator signals and/or determined steering angels at one or more preceding determinations of tentacles.

Regarding the parameter representing the steering commands of the operator, the steering angle command requested by the operator can be converted to a form according to $-1 \leq \mu S^{op} \leq 1$, where $-1$, 1 represents the maximum steering command in each direction, respectively.

The parameter value $v_k^{op}$ can then be determined as:

$v_k^{op} = |\gamma_k - \mu S^{op} \cdot \gamma^{max}|$, where $\gamma_k$ represents the steering angle that corresponds to tentacle k, and $\gamma^{max}$ is the maximum steering angle, and consequently $\mu S^{op} \cdot \gamma^{max}$ is interpreted as the steering angle requested by the operator. This value is also normalized analogous to $v_k^f$ according to the above.

In step 408 the best tentacle is selected based on these parameter values by determining a total value v for each of the tentacles $v = a_0 v^c + a_1 v^f + a_2 v^{op}$, where $a_0$, $a_1$, $a_2$ constitutes weighting parameters that can be used to weight the influence of the various factors on the final tentacle selection. In dependence on how the factors are determined, the tentacle can then be selected as the tentacle for which a maximum or minimum, as in the example, value of v is obtained. When a tentacle then has been selected, the method returns to step 401 for a continued new determination of a tentacle for driving the machine.

When a tentacle then has been selected for the driving of the vehicle, the driving can be performed in various different ways. For example, the vehicle can be driven by setting the steering angle to the steering angle being represented by the selected tentacle. Depending on the point for which the calculation has been carried out, the steering angle can be set directly, or at the time the vehicle has reached the point in front of the vehicle for which the calculation has been carried out. Alternatively, the determined tentacle can be used in the generation of a path that the vehicle then will be made to follow by means of, for example a separate control module, a path tracker module (path tracker), which can be integrated in the control unit 106 or constitute a separate unit, and the function of which being to make the vehicle to follow the determined track as far as possible. This is exemplified in FIG. 5B with the path tracker 512. The use of a path tracker and its function is known to a person skilled in the art.

The above calculations have been exemplified for a machine that is being driven in the forward direction, i.e. with reference to e.g. a LHD machine, with the bucket in the front. The invention, however, can be applied also when the machine is driven with the rear end first, where suitable adaption of distances for the rear portion of the machine is applied instead.

In the disclosed embodiment, the determined tentacle is used to generate a track consisting of points, where each point represents not only the desired position (x,y) of the vehicle, but also the direction (th) and speed $V_\delta$. According to the disclosed embodiment, data generated by the path generator, i.e. the path represented by the above mentioned point shape, is sent to a path tracker module. The path tracker module calculates control signals for the one or more actuators that control articulation angle (or wheel angle where steering wheels are applied) and wheel rotation speed for active steering of the vehicle based on received path data. The data being calculated by the path tracker module can differ from the data calculated by the path generator, for example if the present position of the vehicle deviates from the desired position, where the path tracker module can compensate for this and steer the vehicle towards the calculated path.

With regard to the output signals of the path tracker module in regard of wheel rotation speed it can be advantageous not to follow these directly when controlling the wheel rotation speed. Instead, in order to allow the operator to receive an intuitive sense of controlling the movements of the machine, the minimum value of, for example, the power requested by the operator and the power requested by the path tracker module can be used. Similarly, the maximum value of the break command requested by the operator and the break command requested by the path tracker module can be used. This will have as result that the machine will never move faster than the operator or control system allows, but where the operator, by requesting full power, still can allow the system to limit the speed and thereby drive the machine at the highest speed that is safe, which can be considerably higher than the speed at which the machine would have been driven by the operator.

The look ahead functionality according to the above is advantageous also for the path tracker module since the path tracker module receives knowledge of desired vehicle position not only for the current instant in time, but for a period of time, which renders it easier for the path tracker module to perform corrections of possible deviations in vehicle position.

The present invention consequently allows that vehicles can be driven remote controlled by an operator in, for example, a control room, and where the machine is driven essentially according to the steering commands of the operator but where tentacles are used to choose a path that corresponds to steering commands from the operator to a large extent, but where the control system at the same time influences the control in such a manner that the risk of collision is minimized.

Consequently, the operator can, in principle, control the machine freely, and, for example, drive the machine in a meandering path along, for example, a straight tunnel, but the control system will continuously ensure that the machine never gets closer to the tunnel walls than the above defined safety distance allows. As soon as the steering signals requested by the operator would result in a risk of collision, the control system will prohibit steering that would result in the machine colliding with an obstacle or that would violate the set safety distances, e.g. to tunnel walls. If the machine is driven along a straight and very narrow tunnel, which, in principle, have similar width to the machine plus the safety distance according to the above, the control system can, in principle, force the machine to move essentially straight through the tunnel irrespective of the commands requested by the operator by means of the control stick, since deviations in a lateral direction directly would violate the set safety distances.

The invention has been described above according to a method where a requested path continuously is evaluated against alternative paths. According to one embodiment, the operator is allowed to control the machine freely for as long as the path requested by the operator does not result in the machine being driven within a certain distance from an obstacle, where the path is only influenced in these cases, e.g. by retarding the machine or changing steering angle to avoid the obstacle. According to another embodiment a path is instead chosen according to the above, but where a path that as far as possible corresponds to the path selected by the operator is selected for as long as the path selected by the operator does not result in the machine being driven within a certain distance from an obstacle.

According to one embodiment of the present invention, the operator can, apart from the above mentioned safety distances, select an offset in relation to surrounding obstacles. For example, a ditch can run along one side of a tunnel, in which case it is desirable that the machine is driven closer to the other side. Ditches will not be discovered by the machine when, for example, horizontal laser measurements according to the above are used, with the result that the machine still faces the risk of running into the ditch.

The ditch, however, is normally visible to the operator via video image, and at such situations the operator can, according to one embodiment, influence the lateral safety distance by allowing the operator to add an offset, via a lever, button, graphical display control or other device on the control panel from which the machine is controlled, to the minimum lateral distance that the machine is to keep to the closest obstacle. The machine can, for example, e.g. in a mine drift where a ditch runs along one side of the machine, and in a situation where the minimum distance in general is, for example, 0.5 meter, be requested to maintain a considerably larger minimum distance, such as for example 1.5 m, to obstacles (the wall) on the side of the machine along which the ditch is running, whereby the machine will maintain a minimum distance of 0.5 m to the wall without a ditch and 1.5 m to the wall along which the ditch runs.

Hitherto only a steering angle determination has been carried out, although based on the current speed of the vehicle. That is, the speed of the vehicle can be arranged to completely be controlled by the speed requested by the operator of the machine, and can be represented by either a reference speed or direct commands for requesting power and brake.

According to the above, however, a remote controlled vehicle is usually being driven at considerably lower speed in comparison to, for example, the speed at which the vehicle would be driven when the operator is present at the vehicle, or in fully autonomous operation. According to one embodiment of the present invention, the speed of the vehicle is therefore at least partially determined by the control system of the vehicle. The control system can, for example, comprise stored data regarding the maximum possible speed, or preferred speeds, for various steering angles. A maximum steering angle will, for example have a considerably lower recommended speed than when the vehicle is being driven essentially straight forward. This is because if the machine would turn with maximum steering angle at a high speed the machine would probably skid/slide to a greater or lesser extent, with a possible consequence that the machine e.g. skids/slides away from the desired path and hits surrounding obstacles with damage as result. Conversely, a small steering angle can often be followed also at higher speeds.

According to one embodiment of the present invention, the current speed of the machine is compared with the maximum speed at which the vehicle theoretically could be driven along a determined tentacle without the risk of the vehicle skidding/sliding in an undesired manner. If the current speed at which the vehicle is being driven is lower than the speed at which the vehicle could be driven, the control system can demand an increase of the speed of the vehicle, for example to the maximum speed that the vehicle can be driven at without the risk of undesired skidding etc. Alternatively, the reference speed can be increased by some suitable value. In this way, the reference speed can be successively increased at consecutive determinations of tentacles to finally reach, for example, the maximum recommended speed or a suitable fraction thereof. When the reference speed is too high, e.g. due to a greater steering angle being required, the control system can, conversely, request a reduced speed/retardation.

In order to obtain a favorable fuel economy and minimize wear of brakes and tires it is, however, important to plan in advance when calculating the reference speed.

Figure 9:
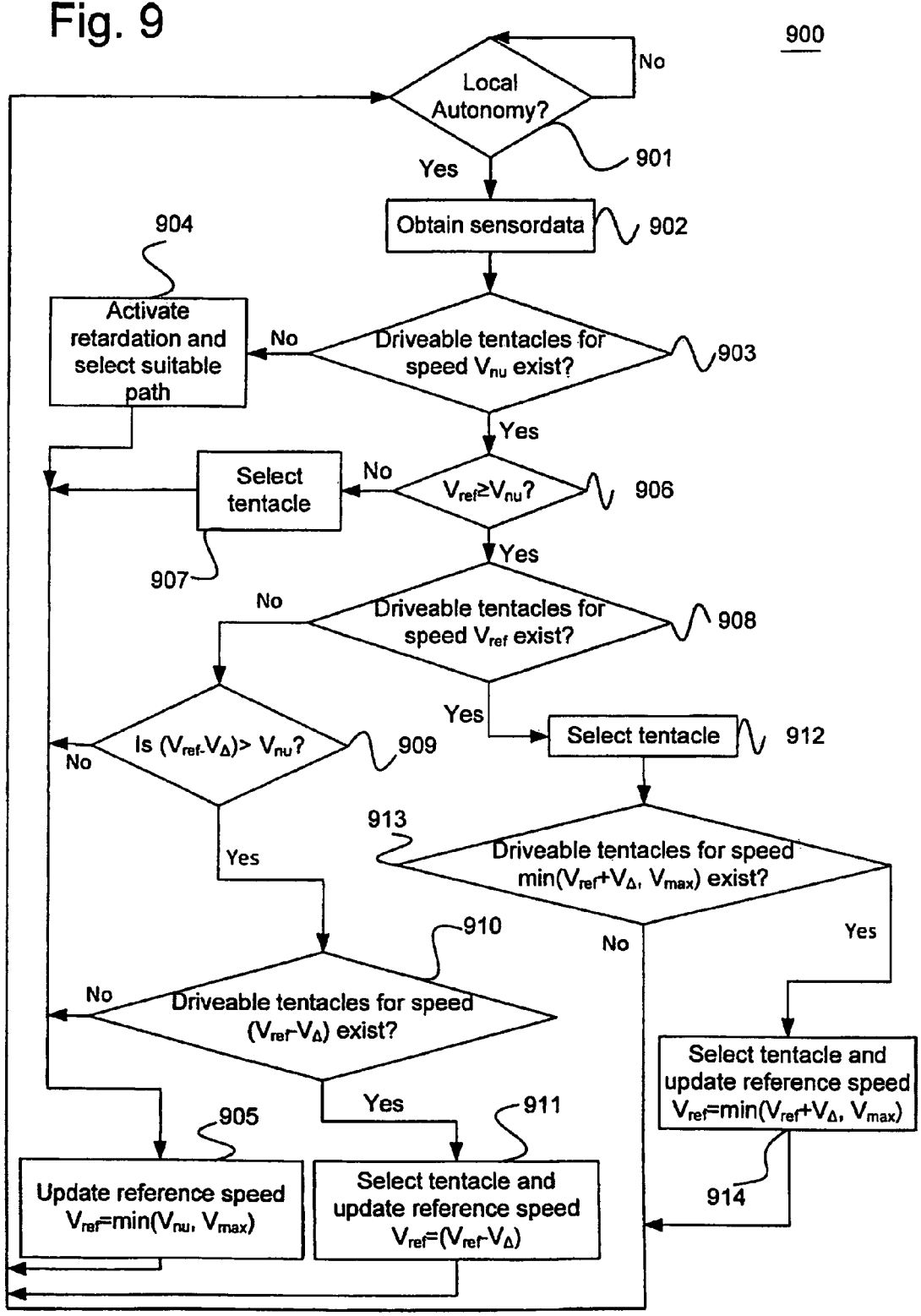
FIG. 9 shows a method for calculating a reference speed for a machine that is driven according to the present invention.

An example of a method 900 for determining a reference speed is disclosed in FIG. 9. According to this method, the previously described method for evaluating a set of tentacles with regard to drivability is applied in a search for drivable paths for one or more speeds that are higher than the current vehicle speed, i.e. tentacle sets for higher speeds than the current speed of the machine are also evaluated.

In the cases where drivable tentacles are found for a speed exceeding the current vehicle speed the machine can be allowed to accelerate to reach this speed.

The method starts in step 901, where it is determined if the reference speed is to be calculated or not. If the vehicle is to be driven by means of local autonomy, the method continues to step 902, where sensor data from the machine is obtained, e.g. articulation angle and current vehicle speed $V_{nu}$, where a reference speed $V_{ref}$ can be set to $V_{nu}$ the first time the method moves from step 901 to step 902. In step 903 a set of tentacles representing the current vehicle speed $V_{nu}$ is evaluated as previously has been described. A suitable brake command is applied if no drivable tentacle exists, and a suitable path is chosen (step 904), and thereafter the reference speed $V_{ref}$ is set in step 905 to the smallest value of $V_{nu}$ and the maximum allowable vehicle speed for local autonomy $V_{max}$. The method then returns to step 901 waiting for the next execution.

In step 904 the appropriate path can be selected, for example, as the tentacle that has the greatest drivable length $l^0$. According to another embodiment it is utilized that the tentacles are evaluated at a point a small distance in front of the reference point of the machine according to what has been described above. A set of tentacles can therefore be evaluated with respect to the reference point of the machine at the lower speed that the machine will have when the machine reaches the point in front of the reference point after a suitable brake command has been activated during the time it takes for the reference point to reach the point in front of the reference point. By means of this method a better path can, in general, be determined, since more drivable tentacles often are available at this lower speed, and the best of these tentacles can consequently be selected in the same manner as for step 408 in method 400.

If, on the other hand, drivable tentacles exist at the speed $V_{nu}$ in step 903 it is evaluated in step 906 if the reference speed $V_{ref}$ is greater than or equal to $V_{nu}$, and if this is not the case the best tentacle is selected in step 907 in the same way as for step 408 in the method 400 in FIG. 4. The reference speed is then set according to step 905.

If $V_{ref}$ is greater than or equal to $V_{nu}$ in step 906 a new set of tentacles representing the speed $V_{ref}$ is evaluated in step 908. The method continues to step 909 if no drivable tentacle exists for speed $V_{ref}$.

In step 909 it is evaluated if the reference speed minus a difference speed $V_\Delta$ is greater than the current vehicle speed. If this is the case the method continues to step 910, and if not the reference speed is updated according to step 905. Step 910 is carried out in the same manner as the previous steps 903 and 908 with the difference that in step 910 a set of tentacles corresponding to the speed $V_{ref}-V_\Delta$ is evaluated.

If drivable tentacles exist at this evaluation the most suitable tentacle is selected in step 911 in the same manner as for step 408 in method 400. In step 911 the reference speed $V_{ref}$ of the vehicle is also updated to correspond to the highest speed ($V_{ref}-V_\Delta$) at which drivable tentacles have been found, whereafter the method returns to step 901. If, on the other hand, no drivable tentacles are found in step 910, the reference speed is set according to step 905.

Returning to step 908, if one or more drivable tentacles exist in the evaluation of a set of tentacles for speed $V_{ref}$, the best tentacle from this set is selected in step 912 in the same manner as for step 408 in method 400. In step 913 a new set of tentacles is then evaluated with respect to the smallest value of the reference speed plus a difference speed ($V_{ref}+V_\Delta$) and the maximum allowable vehicle speed at local autonomy $V_{max}$. If no drivable tentacles are found the method returns to step 901 to wait for the next execution.

If, on the other hand, drivable tentacles are found in step 913 the best tentacle from this set is selected in the same manner as for step 408 in method 400. The reference speed is then updated to the new higher speed at which drivable tentacles have been found, whereafter the method returns to step 901.

The difference speed $V_\Delta$ can be set to arbitrary positive value, such as, for example, 0.5 m/s or some other suitable value.

As is realized the method described in FIG. 9 only constitutes an example on how the reference speed of the machine can be changed by evaluating drivability for sets of tentacles for higher speeds. The reference speed, and thereby the influence on the speed of the machine, can alternatively be determined in any other suitable way. According to one embodiment a flow chart similar to FIG. 9 is applied without steps 906, 907, but where the method otherwise is performed according to the description of FIG. 9.

The invention has so far been described in connection to an underground mine. The invention, however, is also suitable for example in tunneling and other applications where a mining and/or construction machine is utilized. Accordingly, the invention is applicable also in applications above ground. The invention is also suitable for other kinds of vehicles than articulated vehicles.

The invention has so far been described in connection with laser range scanners for generating the representation of the surroundings. It is not, however, essential to the invention that the representation of the surroundings is determined by means of laser range scanners, but arbitrary distance meters can be used for as long as these can provide distance measurements having acceptable accuracy.

The invention has further been described with the purpose to allow an operator to drive a remote controlled machine in a secure manner at higher speeds, where the machine is remote controlled from a control room. Such machines are, however, often also remote controlled by means of portable radio control where the operator can see the machine directly, i.e. with the machine within line-of-sight. Even if the machine is within line-of-sight of the operator during such control it can still be difficult for the operator to obtain a correct view of the position of the machine in relation to the surroundings. The machine can, for example, be present far away in a tunnel, or even around a corner, and it is then difficult to see the position of the machine relative to the tunnel walls. The machine can also in this kind of control be driven in a secure manner without the risk of collision by determining possible paths and controlling the machine according to a possible path, where this possible path is selected at least partially based on the steering commands from the operator.

There are also portable maneuvering systems where the machine is controlled by means of radio control according to the above and another independent communication channel streams video to a monitor that the operator is looking at. There is consequently in this case no cooperation between the systems, and this system consequently consists of a simpler system in comparison to the above described remote control system. The present invention, however, is applicable here as well.

Furthermore, the invention is also applicable in machines that are driven by an operator in a conventional manner, i.e. from a maneuvering position arranged on the machine. Consequently, the invention can be used as support also for a driver that is actually present onboard the machine, whereby the requirement of attention from the driver can be reduced at the same time as the risk of collision at the lack of attention is reduced.

Consequently, the invention is not limited other than in regard of what is stated in the appended claims.

The invention claimed is:

1. Method for driving a mining and/or construction machine, where said machine is arranged to be controlled by an operator by means of maneuvering means, where said operator, when driving said machine, provides steering commands by means of said maneuvering means for maneuvering said machine, wherein the method comprises, when said machine is being driven in an environment having at least a first obstacle:

estimating a path that has been requested by said operator by means of said steering commands, by means of a control system determining whether said machine when moving according to said requested path will be driven within a first distance from said first obstacle, and when said machine, when travelling along said path, will be driven within a first distance from said first obstacle, influencing the path of said machine by means of said control system.

2. Method according to claim 1, wherein said environment comprises a plurality of obstacles, wherein the method further comprises:

by means of said control system determining whether said machine when moving according to said requested path will be driven within a first distance from at least one of said plurality of obstacles, and when said machine when travelling along said path will be driven within a first distance from at least one of said plurality of obstacles, influencing the path of said machine by means of said control system.

3. Method according to claim 1, wherein driving of said machine according to the path requested by said operator is prevented.

4. Method according to claim 1, wherein driving according to the path requested by the operator is prevented by maneuvering said machine by means of said control system according to another path, being different from the path requested by the operator.

5. Method according to claim 1, wherein, when driving said machine, the machine is controlled according to steering commands given by said operator for as long as the path being requested by said steering commands will result in the machine being driven with more than a first distance to said at least one obstacle.

6. Method according to claim 1, wherein, when driving said machine, the machine is controlled essentially according to the steering commands given by said operator for as long as the path being requested by said steering commands results in the machine being driven by more than a first distance to said at least one obstacle, where, during said control, a path is selected by said control system that essentially corresponds to the steering commands given by the operator.

7. Method according to claim 1, further comprising, when determining whether said machine when moving according to said requested path will be driven within a first distance from an obstacle, determining a shortest distance to obstacles along said requested path, where said machine is driven according to said requested path when said shortest distance to an obstacle along said requested path exceeds said first distance.

8. Method according to claim 1, wherein said first distance is determined based on a lateral and/or longitudinal distance to at least one obstacle along said path.

9. Method according to claim 1, wherein, when determining a distance to an obstacle for said requested path, said path is defined as area in front of the machine having a width corresponding to the width of the machine with the addition of a first safety distance, wherein obstacles within said area constitutes obstacles in said path.

10. Method according to claim 9, wherein said lateral safety distance of said machine is set to different values for each side of said machine, respectively.

11. Method according to claim 10, wherein said difference in safety distance at least partially is determined by said operator.

12. Method according to claim 9, wherein the safety distance of the outer side of the machine when turning is dependent on the turning angle of the machine.

13. Method according to claim 12, wherein the steering angle dependent safety distance is dependent of the length of the machine in front of the front wheel axle in the direction of travel.

14. Method according to claim 12, wherein the safety distance on the outer side of the machine when turning, which is dependent on the turning angle of the machine, is applied only in front of the machine.

15. Method according to claim 1, wherein said first distance is a stopping distance for said machine at a current speed, or said stopping distance with the addition of a second distance.

16. Method according to claim 1, further comprising, when influencing the path of said machine:
by means of said control system determining a plurality of possible paths of said machine, and wherein a drivability is determined for each of said paths, and
by means of said path requested by said operator and said drivability of said paths, select one of said plurality of paths.

17. Method according to claim 16, wherein a path where the distance to an obstacle along said path is below said first distance is considered non-drivable.

18. Method according to claim 16, further comprising, when none of said paths are considered drivable, retard said machine.

19. Method according to claim 16, wherein said paths represent different steering angles, respectively, of said machine.

20. Method according to claim 16, wherein said possible paths consist of tracks, such as, for example, circular arcs, where said tracks constitutes tracks that said machine would follow when set to said steering angles, respectively.

21. Method according to claim 16, further comprising:
determining if drivable paths exist for a higher speed than the current speed, where the speed of said machine is increased when drivable paths for a higher speed exist.

22. Method according to claim 16, further comprising:
determining a first speed of said machine,
compare said first speed with a second speed, wherein said second speed is dependent on a steering angle of said vehicle and/or operator commands and/or distance to obstacle in the surroundings, and
by means of said control system increase or decrease the speed of said machine in dependence of said second speed when said first speed deviates from said second speed.

23. Method according to claim 22, wherein said paths are separated from each other by a steering angle separation in the interval 0-10 degrees.

24. Method according to claim 16, further comprising selecting one of said plurality of paths based on a weighted parameter value, wherein when determining said weighted parameter value the path requested by the operator is represented by a first weight and the drivability of a path, respectively, is represented by a second weight.

25. Method according to claim 1, further comprising determining said first distance starting from a position in front of a reference point on said machine, such as in front of the center of the front axle of the machine with respect to the direction of travel.

26. Method according to claim 25, wherein said second position constitutes a position at which said machine will be present within a first time.

27. Method according to claim 1, wherein a distance to said obstacle is determined by means of sensors arranged on said machine.

28. Method according to claim 1, wherein said maneuvering means consists of maneuvering means at a location being remote from said machine, wherein said machine is arranged to be remote controlled by said operator.

29. Method according to claim 28, wherein, in said remote control, picture data from a camera directed in the direction of travel of said machine is shown on a display, wherein movement of said machine in the direction of travel is shown in a direction inwards into said display irrespective if the machine is moved in a forward or reverse direction.

30. Method according to claim 1, wherein said maneuvering means are arranged at said machine, and wherein said machine is arranged to be maneuvered from a maneuvering position onboard said machine.

31. Method according to claim 1, further comprising performing said determination of said path a plurality of times per second.

32. System for driving a mining and/or construction machine, where said machine is arranged to be controlled by an operator by means of maneuvering means, where said operator, when driving said machine, provides steering commands by means of said maneuvering means for maneuvering said machine, wherein the system comprises means for, when said machine is being driven in an environment having at least a first obstacle:
estimating a path that has been requested by said operator by means of said steering commands,
by means of a control system determining whether said machine, when moving according to said requested path, will be driven within a first distance from said first obstacle, and
when said machine, when travelling along said path, will be driven within a first distance from said first obstacle, influencing the path of said machine by means of said control system.

33. Mining—and/or construction machine, wherein said machine comprises a system according to claim 32.

34. Mining—and/or construction machine according to claim 33, wherein said machine constitutes an articulated machine.

* * * * *